US008797967B2

(12) United States Patent
Cheng et al.

(10) Patent No.: US 8,797,967 B2
(45) Date of Patent: Aug. 5, 2014

(54) METHOD, USER EQUIPMENT AND BASE STATION FOR TRANSMITTING UPLINK CONTROL INFORMATION

(71) Applicant: Huawei Technologies Co., Ltd., Shenzhen (CN)

(72) Inventors: Yan Cheng, Beijing (CN); Yongxia Lv, Beijing (CN); Xiaobo Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/633,010

(22) Filed: Oct. 1, 2012

(65) Prior Publication Data

US 2013/0028192 A1 Jan. 31, 2013

Related U.S. Application Data

(63) Continuation of application No. PCT/CN2011/072469, filed on Apr. 6, 2011.

(30) Foreign Application Priority Data

Apr. 7, 2010 (CN) .......................... 2010 1 0146531

(51) Int. Cl.
*H04J 3/16* (2006.01)
*H04L 1/00* (2006.01)
*H04L 5/00* (2006.01)
*H04L 1/16* (2006.01)
*H04W 72/04* (2009.01)
*H04L 1/12* (2006.01)

(52) U.S. Cl.
CPC ......... *H04W 72/0413* (2013.01); *H04L 1/0045* (2013.01); *H04L 5/0053* (2013.01); *H04L 1/004* (2013.01); *H04L 5/0007* (2013.01); *H04L 5/0098* (2013.01); *H04L 1/1607* (2013.01); *H04L 5/001* (2013.01); *H04L 1/0073* (2013.01); *H04L 2001/125* (2013.01); *H04L 1/0026* (2013.01)
USPC .......................................... 370/328; 370/465

(58) Field of Classification Search
USPC ......... 370/311, 328, 329, 431, 433, 437, 465, 370/478; 455/68, 422.1, 450, 509, 522, 455/524; 714/748
See application file for complete search history.

(56) References Cited

U.S. PATENT DOCUMENTS 8,295,779 B2  10/2012 Cave et al.
8,477,699 B2  7/2013 Damnjanovic et al.
(Continued)

FOREIGN PATENT DOCUMENTS

CN  101409894 A  4/2009
CN  101478379 A  7/2009
(Continued)

OTHER PUBLICATIONS

Written Opinion of the International Searching Authority for PCT/CN2011/072469, mailed Jul. 14, 2011, 3 pages.
(Continued)

*Primary Examiner* — Andrew Chriss
*Assistant Examiner* — Jose Perez
(74) *Attorney, Agent, or Firm* — Slater & Matsil, L.L.P.

(57) ABSTRACT

The disclosure discloses a method for transmitting uplink control information. The method includes: receiving, by a user equipment, a carrier activation command or a carrier deactivation command in a downlink subframe n; updating a first downlink activated carrier set according to the received carrier activation command or the carrier deactivation command into a second downlink activated carrier set; taking the second downlink activated carrier set as a current downlink activated carrier set corresponding to a first uplink subframe which belongs to a subframe set of an uplink subframe n+k and uplink subframe(s) after the uplink subframe n+k; sorting X piece(s) of Uplink Control Information (UCI) corresponding to X downlink carrier(s) according to a sorting rule, and transmitting the sorted X pieces of UCI to a base station in the first uplink subframe.

10 Claims, 11 Drawing Sheets

(56) References Cited

U.S. PATENT DOCUMENTS

| | | | |
|---|---|---|---|
| 2008/0153425 | A1 | 6/2008 | Heo et al. |
| 2010/0098012 | A1* | 4/2010 | Bala et al. ............... 370/329 |
| 2010/0113004 | A1* | 5/2010 | Cave et al. ............. 455/422.1 |
| 2010/0215011 | A1* | 8/2010 | Pan et al. ............... 370/329 |
| 2010/0254329 | A1* | 10/2010 | Pan et al. ............... 370/329 |
| 2010/0303039 | A1* | 12/2010 | Zhang et al. ............ 370/331 |
| 2011/0021191 | A1* | 1/2011 | Damnjanovic et al. ....... 455/434 |
| 2011/0170495 | A1* | 7/2011 | Earnshaw et al. ........... 370/329 |

FOREIGN PATENT DOCUMENTS

| | | |
|---|---|---|
| CN | 101541090 A | 9/2009 |
| CN | 101772144 A | 7/2010 |
| EP | 2330845 A1 | 6/2011 |
| WO | WO 02/078241 A1 | 10/2002 |
| WO | WO 2010/016698 A2 | 2/2010 |
| WO | WO 2010016698 A2 * | 2/2010 |
| WO | WO 2010/032811 A1 | 3/2010 |
| WO | WO 2011/124129 A1 | 10/2011 |

OTHER PUBLICATIONS

International Search Report for PCT/CN2011/072469, mailed Jul. 14, 2011, 3 pages.

3GPP TS 36.212 V9.1.0 (Mar. 2010), 3rd Generation Partnership Project; Technical Specification Group Radio Access Network; Evolved Universal Terrestrial Radio Access (E-UTRA); Multiplexing and channel coding (Release 9), 61 pages.

3GPP TS 36.213 V9.1.0 (Mar. 2010), 3rd Generation Partnership Project; Technical Specification Group Radio Access Network; Evolved Universal Terrestrial Radio Access (E-UTRA); Physical layer procedures (Release 9), 79 pages.

3GPP TS 36.321 V9.1.0 (Dec. 2009), 3rd Generation Partnership Project; Technical Specification Group Radio Access Network; Evolved Universal Terrestrial Radio Access (E-UTRA); Medium Access Control (MAC) protocol specification, (Release 9), 48 pages.

3GPP TSG RAN WG1 Meeting #60 R1-101253, "Support of UL ACK/NACK Channel Selection for Carrier Aggregation," San Francisco, Feb. 22-26, 2010, 6 pages.

3GPP TSG RAN WG1 Meeting #60bis, R1-101885, "On PUCCH Resource Allocation for CA," Beijing, China, Apr. 12-16, 2010, 4 pages.

3GPP TSG-RAN WG2 #68bis, Tdoc R2-100079, "Summary of the Email Discussion [68#23] LTE: CC Activation/Deactivation," Valencia, Spain, Jan. 18-22, 2010, 18 pages.

Extended European Search Report for 11765047.3, mailed Feb. 25, 2013, 15 pages.

Chinese Issue Communication for 2010101465313, mailed Jan. 16, 2013, 2 pages.

Office Action from USPTO for U.S. Appl. No. 13/914,432, mailed Aug. 26, 2013, 30 pages.

Technical Specification, 3GPP TS 25.214, "3rd Generation Partnership Project, Group Radio Access Network; Physical layer procedures (FDD)", Release 8, V8.8.0, Dec. 2009, 93 pages.

\* cited by examiner

METHOD, USER EQUIPMENT AND BASE STATION FOR TRANSMITTING UPLINK CONTROL INFORMATION

This application is a continuation of co-pending International Application No. PCT/CN2011/072469, filed Apr. 6, 2011, which designated the United States and was not published in English, and which claims priority to Chinese Patent Application No. 201010146531.3, filed Apr. 7, 2010, both of which applications are incorporated herein by reference.

TECHNICAL FIELD

The present invention relates to the field of communications technologies, and in particular, to a method, a system, a user equipment and a base station for transmitting uplink control information.

BACKGROUND

The LTE-A (Long Term Evolution-Advanced) is a further evolved and enhanced system based on a 3GPP LTE (3rd Generation Partnership Project Long Term Evolution) system. In the LTE-A system, a CA (Carrier Aggregation) technology is introduced, which is also referred to as a frequency spectrum aggregation technology or bandwidth expansion technology. In a carrier aggregation scenario, frequency spectrums of two or more CCs (Component Carriers) are aggregated to obtain larger transmission bandwidth.

When performing decoding, an eNB (Evolved NodeB, base station) needs to learn the total number of bits of the original information of UCI (Uplink Control Information) joint channel coding adopted by a UE, that is, to ensure that the eNB and UE have consistent understanding on the total number of bits of the original information of UCI joint coding of multiple downlink carriers, so as to perform correct decoding. However, the existing method for transmitting UCI causes the eNB to decode the jointly coded UCI incorrectly.

SUMMARY OF THE INVENTION

Embodiments of the present invention provide a method, a user equipment and a base station for transmitting uplink control information, so as to avoid a problem that the eNB decodes the jointly coded UCI incorrectly.

In an aspect, a method for transmitting uplink control information in an embodiment of the present invention is provided, including: receiving, by a user equipment (UE), a carrier activation command or a carrier deactivation command in a downlink subframe n; updating, by the UE, a first downlink activated carrier set according to the received carrier activation command or the carrier deactivation command into a second downlink activated carrier set; taking, by the UE, the second downlink activated carrier set as a current downlink activated carrier set corresponding to a first uplink subframe; wherein the first uplink subframe belongs to a subframe set of an uplink subframe n+k and uplink subframe(s) after the uplink subframe n+k; and wherein n or k is a positive integer, and k is greater than or equal to 5; sorting, by the UE, X piece(s) of Uplink Control Information (UCI) corresponding to X downlink carrier(s) according to a sorting rule, wherein X is a positive integer, and the X downlink carrier(s) belong to the current downlink activated carrier set; and transmitting, by the UE, the sorted X pieces of UCI to a base station in the first uplink subframe.

In an aspect, a method for transmitting uplink control information in another embodiment of the present invention is provided, including: sending, by a base station, a carrier activation command or a carrier deactivation command in a downlink subframe n; receiving, by the base station, sorted X piece(s) of Uplink Control Information (UCI) corresponding to X downlink carrier(s) in a first uplink subframe from a user equipment (UE); and determining, by the base station, a piece of UCI corresponding to a downlink carrier of the X downlink carrier(s) according to the sorted X piece(s) of UCI; wherein the sorted X piece(s) of UCI are sorted by the UE according to a sorting rule; wherein X is a positive integer, and the X downlink carrier(s) belong to a current downlink activated carrier set; wherein a first downlink activated carrier set is updated by the UE into a second downlink activated carrier set according to the carrier activation command or the carrier deactivation command and the second downlink activated carrier is taken as the current downlink activation carrier set corresponding to the first uplink subframe; and wherein the first uplink subframe belongs to a subframe set of an uplink subframe n+k and uplink subframe(s) after the uplink subframe n+k, and n or k is a positive integer, and k is greater than or equal to 5.

In an aspect, a user equipment in an embodiment of the present invention is provided, including: a receiver, configured to receive a carrier activation command or a carrier deactivation command in a downlink subframe n; a processor, configured to update a first downlink activated carrier set according to the received carrier activation command or the carrier deactivation command into a second downlink activated carrier set; take the second downlink activated carrier set as a current downlink activated carrier set corresponding to a first uplink subframe; and sort X piece(s) of Uplink Control Information (UCI) corresponding to X downlink carrier(s) according to a sorting rule, wherein the first uplink subframe belongs to a subframe set of an uplink subframe n+k and uplink subframe(s) after the uplink subframe n+k, n or k is a positive integer, k is greater than or equal to 5, X is a positive integer, and the X downlink carrier(s) belong to the current downlink activated carrier set; a transmitter, configured to transmit the sorted X pieces of UCI to a base station in the first uplink subframe.

In an aspect, a base station in an embodiment of the present invention is provided, including: a transmitter, configured to send a carrier activation command or a carrier deactivation command in a downlink subframe n; a receiver, configured to receive sorted X piece(s) of Uplink Control Information (UCI) corresponding to X downlink carrier(s) in a first uplink subframe from a user equipment (UE); and a processor, configured to determine a piece of UCI corresponding to a downlink carrier of the X downlink carrier(s) according to the sorted X piece(s) of UCI; wherein the sorted X piece(s) of UCI are sorted by the UE according to a sorting rule; wherein X is a positive integer, and the X downlink carrier(s) belong to a current downlink activated carrier set; wherein a first downlink activated carrier set is updated by the UE into a second downlink activated carrier set according to the carrier activation command or the carrier deactivation command and the second downlink activated carrier is taken as the current downlink activation carrier set corresponding to the first uplink subframe; and wherein the first uplink subframe belongs to a subframe set of an uplink subframe n+k and uplink subframe(s) after the uplink subframe n+k, and n or k is a positive integer, and k is greater than or equal to 5.

When the UE reports UCI, by delaying effective time of the carrier activation command/deactivation command, the problem that the base station decodes the jointly coded UCI incorrectly due to inconsistent understanding of the UE and eNB on the total number of original information bits of UCI joint coding of multiple downlink carriers may be solved.

DETAILED DESCRIPTION OF ILLUSTRATIVE EMBODIMENTS

Figure 1:
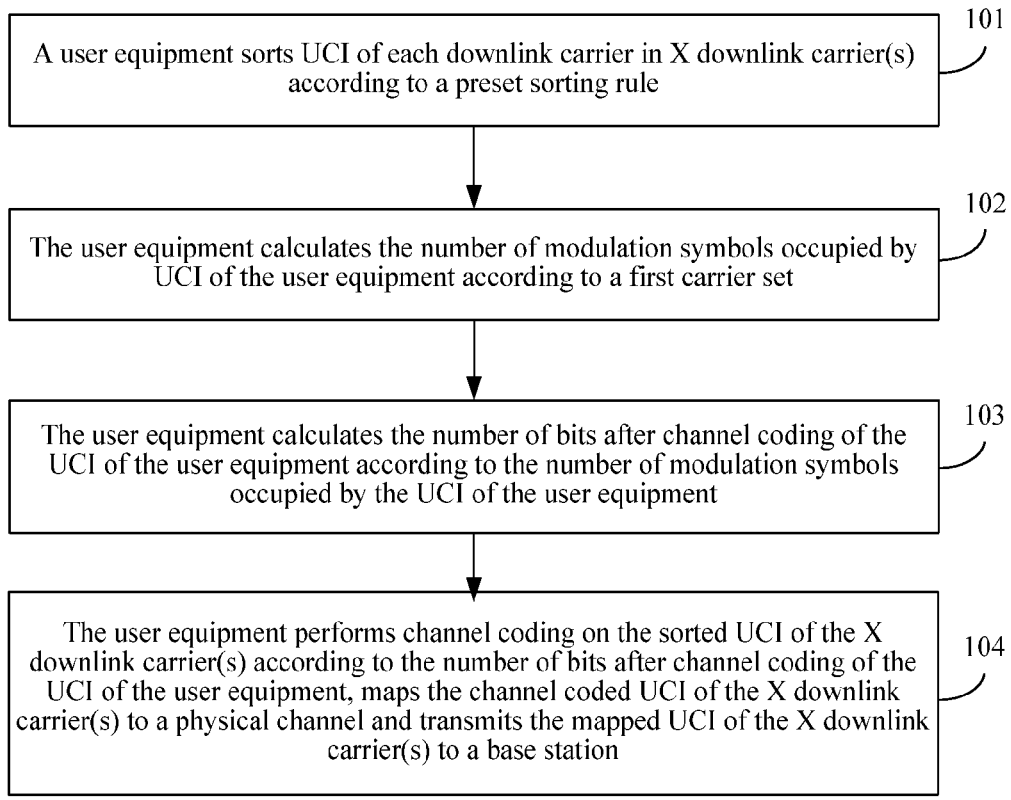
FIG. 1 is a flow chart of a method for transmitting uplink control information according to an embodiment of the present invention.

For better understanding of the objectives, technical solutions, and advantages of the present invention, the embodiments of the present invention are described in further detail below with reference to the accompanying drawings.

In a carrier aggregation scenario, an eNB configures or reconfigures a schedulable carrier set, for example, a UE DL CC set (User Equipment Downlink Component Carrier Set), for an LTE-A user equipment through semi-static RRC (Radio Resource Control) signaling. Meanwhile, in order to save power, a carrier activation (namely, turning on)/deactivation (namely, turning off) mechanism is introduced based on the semi-statically configured UE DL CC set. Except a downlink main carrier, other component carriers may be activated or deactivated according to service requirements. If a current service rate of a UE (User Equipment) increases, the eNB may activate one or several carriers that are not activated in the UE DL CC set to perform data transmission. If the current service rate of the UE decreases, the eNB may deactivate one or several carriers that are already activated except the main downlink carrier in the UE DL CC set. Activation/deactivation is completed through MAC (Medium Access Control) layer signaling. Each piece of MAC layer carrier activation command/deactivation command may activate or deactivate one or more carriers except the main carrier in the UE DL CC set. After delivering the MAC layer signaling, the eNB may learn whether the activation command/deactivation command is transmitted successfully through ACK/NACK feedback. For the deactivation command, an implicit deactivation mechanism is further introduced for optimization, that is, an implicit deactivation timer is introduced. The timer is started at a certain reception, and if the timer times out, a corresponding carrier is deactivated.

Meanwhile, in an LTE-A system, in order to support technologies, such as dynamic scheduling, downlink MIMO (Multiple Input Multiple) transmission and hybrid automatic retransmission, the UE needs to transmit UCI of a downlink carrier to the eNB through a PUCCH (Physical Uplink Control Channel) and/or PUSCH (Physical Uplink Share Channel), and the UE needs to transmit UCI of multiple downlink carriers to the eNB in the carrier aggregation scenario. In the LTE-A system, UCI that the UE needs to transmit usually includes CSI (Channel State Information) and HARQ (Hybrid Automatic Repeat request) acknowledgment information (ACK (Acknowledgment)/NACK (Negative Acknowledgement)). CSI usually includes implicit channel state information, such as CQI (Channel Quality Information), RI (Rank Indication), PMI (Precoding Matrix Indicator), and direct channel state information, such as a channel matrix or a channel covariance matrix.

Currently, in the carrier aggregation scenario, when ACK/NACK or CSI of multiple downlink carriers is transmitted on one PUCCH or one PUSCH, usually, the UE needs to perform joint channel coding on the ACK/NACK or CSI of the multiple downlink carriers. The eNB performs decoding according to the channel coding method adopted by the UE.

When performing decoding, the eNB needs to know the total number of original information bits of UCI (Uplink Control Information) joint channel coding adopted by a UE, that is, to ensure that the eNB and the UE have consistent understanding on the total number of original information bits of UCI joint coding of multiple downlink carriers, so as to perform correct decoding. However, the existing method for transmitting UCI causes that the eNB decodes the jointly coded UCI incorrectly.

Referring to FIG. 1, an embodiment of the present invention provides a method for transmitting uplink control information, which includes the following.

101: A user equipment sorts uplink control information UCI of each downlink carrier in X downlink carrier(s) according to a preset sorting rule, where X is a positive integer, the X downlink carrier(s) belong to a downlink component carrier set of the user equipment, the downlink component carrier set of the user equipment at least includes two downlink component carriers, and at least one downlink carrier in the X downlink carrier(s) belongs to a downlink activated carrier set of the user equipment.

102: The user equipment calculates, according to a first carrier set, the number of modulation symbols occupied by UCI of the user equipment, where the first carrier set is one of the following sets: the downlink component carrier set of the user equipment, a maximum downlink carrier set supportable by the user equipment, and a smaller one of the downlink component carrier set of the user equipment and the maximum downlink carrier set supportable by the user equipment.

103: The user equipment calculates the number of bits after channel coding of UCI of the user equipment according to the number of modulation symbols occupied by UCI of the user equipment.

104: The user equipment performs channel coding for the sorted UCI of the X downlink carrier(s) according to the number of bits after channel coding of UCI of the user equipment, maps the channel coded UCI of the X downlink carrier(s) to a physical channel and transmits the mapped UCI of the X downlink carrier(s) to a base station.

Further, when UCI of the user equipment is hybrid automatic repeat request HARQ acknowledgment information, the X downlink carrier(s) are all downlink carriers in the downlink activated carrier set.

Further, when UCI of the user equipment is channel state information CSI, the X downlink carrier(s) are determined according to CSI configuration configured by higher layers and whether aperiodic CSI is to be reported, and the X downlink carrier(s) belong to the downlink activated carrier set of the user equipment.

Further, the preset sorting rule includes one of the following rules: performing sorting according to an increasing order of attributes of downlink carriers corresponding to UCI of the downlink carriers; performing sorting according to a decreasing order of attributes of downlink carriers corresponding to UCI of the downlink carriers; performing sorting according to an activation sequence of the downlink carriers.

Further, when UCI of each downlink carrier in the X downlink carrier(s) is sorted according to the activation sequence of the downlink carriers, if multiple downlink carriers are activated at the same time, UCI of the multiple downlink carriers activated at the same time is sorted according to the increasing or decreasing order of the attributes of the downlink carriers.

Further, an attribute of a downlink carrier is a carrier index or a carrier frequency.

Further, when UCI of the user equipment is the channel state information CSI, the calculating, by the user equipment according to the first carrier set, the number of modulation symbols occupied by UCI of the user equipment is specifically: calculating, by the user equipment, the number of modulation symbols occupied by CSI of the user equipment, according to the first carrier set, CSI configuration configured by higher layers and whether aperiodic CSI is to be reported.

In the method for transmitting uplink control information according to the embodiment of the present invention, the user equipment performs channel coding on UCI of the X downlink carrier(s) according to the number of bits after channel coding of UCI of the user equipment, and transmits UCI of the X downlink carrier(s) to the base station, thereby solving the problem that the base station decodes the jointly coded UCI incorrectly due to inconsistent understanding of the user equipment and base station on the total number of original information bits of UCI joint coding of multiple downlink carriers. Moreover, the user equipment sorts UCI of multiple downlink carriers according to the preset sorting rule, so that the base station may determine UCI corresponding to each downlink carrier.

Figure 2:
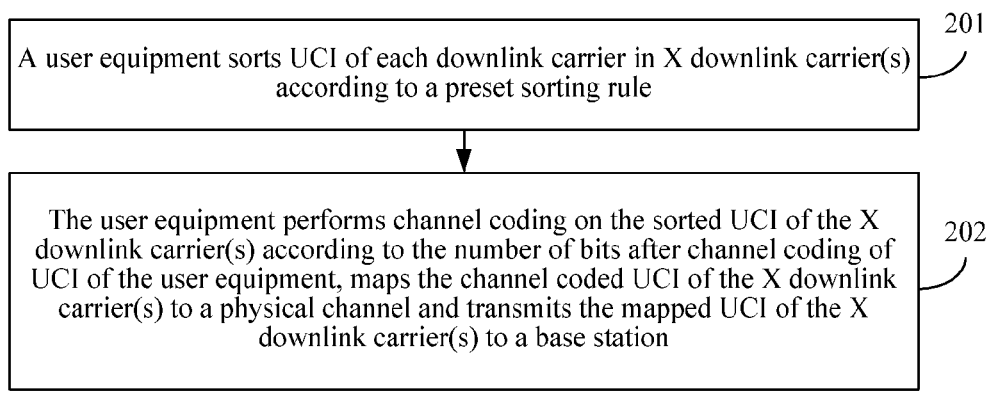
FIG. 2 is a flow chart of another method for transmitting uplink control information according to an embodiment of the present invention.

Referring to FIG. 2, an embodiment of the present invention provides another method for transmitting uplink control information, which includes the following.

201: A user equipment sorts uplink control information UCI of each downlink carrier in X downlink carrier(s) according to a preset sorting rule, where X is a positive integer, and the X downlink carrier(s) belong to a downlink activated carrier set of the user equipment.

202: The user equipment performs channel coding for the sorted UCI of the X downlink carrier(s) according to the number of bits after channel coding of UCI of the user equipment, maps the channel coded UCI of the X downlink carrier(s) to a physical channel and transmits the mapped UCI of the X downlink carrier(s) to a base station.

Further, when UCI of the user equipment is hybrid automatic repeat request HARQ acknowledgment information, the X downlink carrier(s) are all downlink carriers in the downlink activated carrier set.

Further, the preset sorting rule is: performing sorting according to an activation sequence of the downlink carriers.

Further, when UCI of the X downlink carrier(s) and a scheduling request SR are reported on the same subframe, the preset sorting rule is: performing sorting according to a sequence of arranging the SR first, and then arranging UCI of each downlink carrier in the X downlink carrier(s) after the SR based on the activation sequence of the downlink carriers.

Further, when UCI of each downlink carrier in the X downlink carrier(s) is sorted according to the activation sequence of the downlink carriers, if multiple downlink carriers are activated at the same time, UCI of the multiple downlink carriers activated at the same time is sorted according to attributes of the downlink carriers.

Further, an attribute of a downlink carrier is a carrier index or a carrier frequency.

In the method for transmitting uplink control information according to the embodiment of the present invention, the user equipment performs channel coding on UCI of the X downlink carrier(s) according to the number of bits after channel coding of UCI of the user equipment, and transmits UCI of the X downlink carrier(s) to the base station, thereby solving the problem that the base station decodes the jointly coded UCI incorrectly due to inconsistent understanding of the user equipment and base station on the total number of original information bits of UCI joint coding of multiple downlink carriers. Moreover, the user equipment sorts UCI of multiple downlink carriers according to the preset sorting rule, so that the base station may determine UCI corresponding to each downlink carrier.

Figure 3:
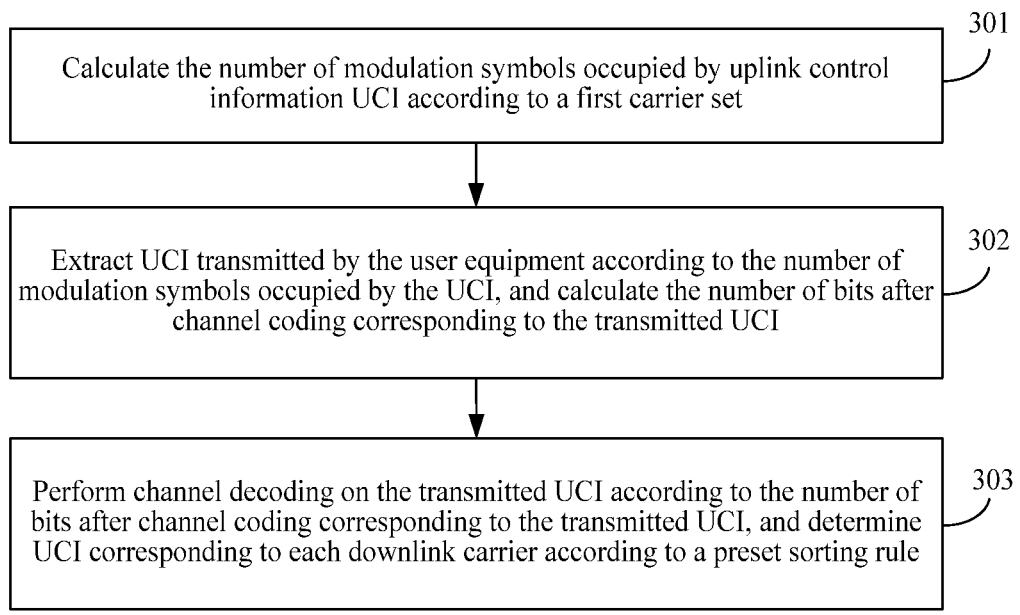
FIG. 3 is a flow chart of another method for transmitting uplink control information according to an embodiment of the present invention.

Referring to FIG. 3, an embodiment of the present invention provides another method for transmitting uplink control information, which includes the following.

301: Calculate the number of modulation symbols occupied by uplink control information UCI according to a first carrier set, where the first carrier set is one of the following sets: a downlink component carrier set of a user equipment, a maximum downlink carrier set supportable by the user equipment, and a smaller one of the downlink component carrier set of the user equipment and the maximum downlink carrier set supportable by the user equipment, and the downlink component carrier set of the user equipment at least includes two downlink component carriers.

302: According to the number of modulation symbols occupied by UCI, extract UCI transmitted by the user equipment, and calculate the number of bits after channel coding corresponding to the transmitted UCI.

303: Perform channel decoding on the transmitted UCI according to the number of bits after channel coding corresponding to the transmitted UCI, and determine UCI corresponding to each downlink carrier according to a preset sorting rule.

Further, when UCI of the user equipment is channel state information CSI, the calculating the number of modulation symbols occupied by UCI according to the first carrier set is specifically: calculating the number of modulation symbols occupied by CSI, according to the first carrier set, CSI configuration configured by higher layers and whether aperiodic CSI is to be reported.

Further, the preset sorting rule includes one of the following rules: performing sorting according to an increasing order of attributes of downlink carriers corresponding to UCI of the downlink carriers; performing sorting according to a decreasing order of attributes of downlink carriers corresponding to UCI of the downlink carriers; performing sorting according to an activation sequence of the downlink carriers.

Further, when the preset sorting rule is performing sorting according to the activation sequence of the downlink carriers, if multiple downlink carriers are activated at the same time, UCI of the multiple downlink carriers activated at the same time is sorted according to the increasing order or decreasing order of the attributes of the downlink carriers.

Further, an attribute of a downlink carrier is a carrier index or a carrier frequency.

In the method for transmitting uplink control information according to the embodiment of the present invention, a base station obtains, according to the first carrier set, the number of modulation symbols occupied by UCI, extracts, according to the number of modulation symbols occupied by UCI, UCI transmitted by the user equipment, and obtains the number of bits after channel coding corresponding to the transmitted UCI, thereby solving the problem that the base station decodes the jointly coded UCI incorrectly due to inconsistent understanding of the base station and the user equipment on the total number of original information bits of UCI joint coding of multiple downlink carriers. Moreover, the base station may determine UCI corresponding to each downlink carrier according to the preset sorting rule.

An embodiment of the present invention provides another method for transmitting uplink control information, which includes: according to the preset number of bits after channel coding corresponding to uplink control information UCI, performing detection on UCI transmitted by a user equipment, and according to a preset sorting rule, determining UCI corresponding to each downlink carrier.

Further, the preset sorting rule is performing sorting according to an activation sequence of downlink carriers; if multiple downlink carriers are activated at the same time, UCI of the multiple downlink carriers activated at the same time is sorted according to an increasing or a decreasing order of attributes of the downlink carriers.

Further, when UCI of the user equipment and a scheduling request SR are reported on the same subframe, the determining UCI corresponding to each downlink carrier according to the preset sorting rule is specifically: determining the SR and UCI corresponding to each downlink carrier according to a sequence of arranging the SR first, and then arranging UCI of the X downlink carrier(s) after the SR based on an activation sequence of the downlink carriers, where X is a positive integer.

In the method for transmitting uplink control information according to the embodiment of the present invention, a base station performs detection on UCI transmitted by the user equipment according to the preset number of bits after channel coding corresponding to the uplink control information UCI, thereby solving the problem that the base station decodes the jointly coded UCI incorrectly due to inconsistent understanding of the base station and the user equipment on the total number of original information bits of UCI joint coding of multiple downlink carriers. Moreover, the base station may determine UCI corresponding to each downlink carrier according to the preset sorting rule.

For better understanding of the embodiment of the present invention, the method of the embodiment of the present invention being applied in a carrier aggregation scenario, where ACK/NACK of one or more downlink carriers is transmitted on a PUSCH, is taken as an example for further illustration.

Figure 4:
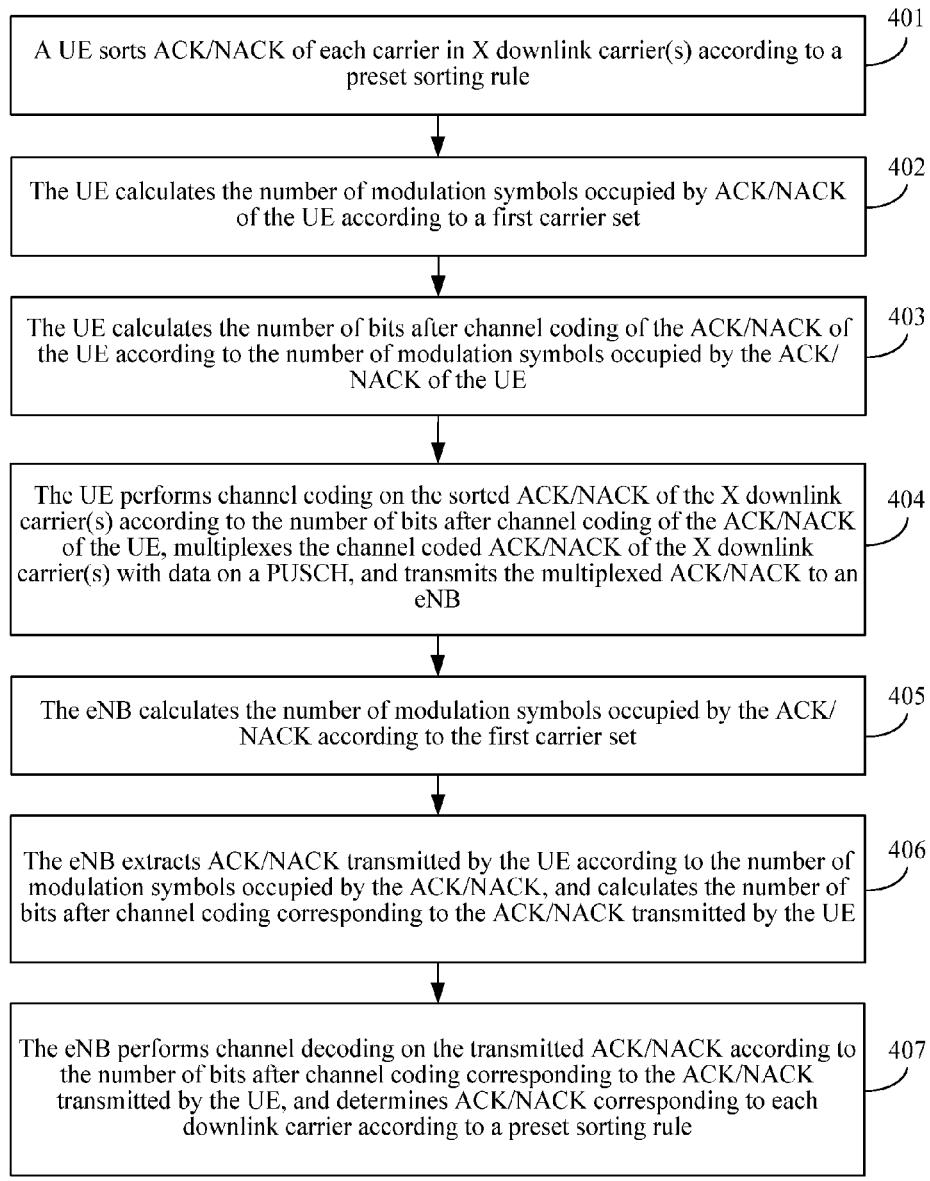
FIG. 4 is a flow chart of another method for transmitting uplink control information according to an embodiment of the present invention.

Referring to FIG. 4, an embodiment of the present invention provides another method for transmitting uplink control information, which includes the following.

401: A UE sorts ACK/NACK of each downlink carrier in X downlink carrier(s) according to a preset sorting rule, where X is a positive integer, the X downlink carrier(s) belong to a downlink component carrier set of the UE, the downlink component carrier set of the user equipment at least includes two downlink component carriers, at least one downlink carrier in the X downlink carrier(s) belongs to a downlink activated carrier set of the user equipment, and the X downlink carrier(s) herein are all downlink carriers of a downlink carrier set of the UE.

The preset sorting rule may be performing sorting according to an activation sequence of the downlink carriers. Moreover, when multiple downlink carriers are activated at the same time, ACK/NACK of the multiple downlink carriers activated at the same time may be sorted according to attributes of the downlink carriers corresponding to ACK/NACK of the downlink carriers. An attribute of a downlink carrier may be a carrier index (Carrier Index/Carrier Identity) or a carrier frequency of the downlink carrier. Specifically, the ACK/NACK of the multiple downlink carriers activated at the same time may be sorted according to an increasing or a decreasing order of attributes of the downlink carriers.

Specifically, for each downlink carrier in the X downlink carriers, if the ACK/NACK is required to be fed back, and the ACK/NACK supports spatial bundling (spatial bundling), each downlink carrier corresponds to 1-bit ACK or NACK; if the ACK/NACK is required to be fed back, and the ACK/NACK does not support spatial bundling, each downlink carrier corresponds to 2-bit ACK or NACK. If the ACK/NACK is not required to be fed back, and the ACK/NACK supports spatial bundling, each downlink carrier corresponds to 1-bit NACK; if the ACK/NACK is not required to be fed back, and the ACK/NACK does not support spatial bundling, each downlink carrier corresponds to 2-bit NACK. The requiring the ACK/NACK to be fed back refers to that information of requiring the ACK/NACK to be fed back, such as data or PDCCH (Physical Downlink Control Channel) signaling that indicates release of downlink SPS (Semi-Persistent Scheduling) resources, is detected on the carrier.

The UE determines original information of the ACK/NACK of each downlink carrier in the X downlink carrier(s) according to the foregoing method, so that the total number of original information bits $O^{ACK}$ in the X downlink carrier(s) is: $O^{ACK}=X$ or $O^{ACK}=2X$. X corresponds to a scenario where the ACK/NACK supports spatial bundling, and 2X corresponds to a scenario where the ACK/NACK does not support spatial bundling.

402: The UE calculates the number of modulation symbols (coded symbols or modulation symbols) occupied by ACK/NACK of the UE, according to a first carrier set (CC set).

The first carrier set may be a downlink component carrier set of the user equipment (User Equipment Downlink Component Carrier Set), a maximum downlink carrier set supportable by the UE, or a smaller one of the downlink component carrier set of the user equipment and the maximum downlink carrier set supportable by the UE. Specifically, the number of modulation symbols occupied by the ACK/NACK of the user equipment is calculated according to the first carrier set and by utilizing Formula (1).

$$Q' = \min\left(\left\lceil \frac{O \cdot M_{sc}^{PUSCH-initial} \cdot N_{symb}^{PUSCH-initial} \cdot N_{layer} \cdot \beta_{offset}^{PUSCH}}{\sum_{r=0}^{C-1} K_r} \right\rceil, 4 \cdot M_{sc}^{PUSCH}\right) \quad (1)$$

Q' indicates the number of modulation symbols occupied by the ACK/NACK of the user equipment. O indicates the total number of information bits of all ACK/NACK corresponding to the first carrier set, where when the ACK/NACK of each downlink carrier supports spatial bundling, O=M, and when the ACK/NACK of each downlink carrier does not support spatial bundling, O=2M. M indicates the number of carriers included in the first carrier set. $N_{layer}$ indicates the total number of layers corresponding to code words to which the ACK/NACK is mapped. $M_{sc}^{PUSCH-initial}$ indicates the transmission bandwidth of the PUSCH during initial transmission of the same transmission block. $M_{sc}^{PUSCH}$ indicates the transmission bandwidth of a PUSCH corresponding to a current subframe. $N_{symb}^{PUSCH-initial}$ indicates the number of SC-FDMA (Single Carrier Frequency Division Multiple Access) symbols occupied by the same transmission block during initial transmission. $\beta_{offset}^{PUSCH}$ indicates the offset of the ACK/NACK relative to the data MSC (Modulation and Coding Scheme). $\beta_{offset}^{PUSCH}=\beta_{offset}^{HARQ-ACK}$, where a value of $\beta_{offset}^{HARQ-ACK}$ is notified by upper-layer RRC (Radio Resource Control) signaling. C indicates the number of code blocks. $K_r$ is a sum of the number of information bits of an r th code block and the number of CRC (Cyclical Redundancy Check) check bits.

403: The UE calculates the number of bits after channel coding of the ACK/NACK of the UE according to the number of modulation symbols occupied by the ACK/NACK of the UE.

Specifically, the number of bits after channel coding of the ACK/NACK of the UE is calculated according to the number of modulation symbols Q' occupied by the ACK/NACK of the UE obtained in step 402 and by utilizing Formula (2).

$$Q = Q_m \cdot Q' \quad (2)$$

where Q' indicates the number of modulation symbols occupied by the ACK/NACK of the UE; Q indicates the number of bits after channel coding of the ACK/NACK of the UE; and $Q_m$ indicates a modulation order.

404: The UE performs channel coding for the sorted ACK/NACK of the X downlink carrier(s) according to the number of bits after channel coding of the ACK/NACK of the UE, multiplexes the channel coded sorted ACK/NACK of the X downlink carrier(s) on a PUSCH with data, and transmits the multiplexed ACK/NACK to an eNB.

For example, if the original information of the sorted ACK/NACK of the X downlink carrier(s) obtained in step 401 has 3 bits, and the number of bits after channel coding of the ACK/NACK of the UE obtained in step 403 is 20 bits, then in this step, when channel coding is performed on the sorted ACK/NACK of the X downlink carriers, the 3-bit ACK/NACK should be coded to be 20-bit. In addition, exemplarily, RM (Reed-Muller) coding is adopted in this embodiment of the present invention, and in actual applications, any other feasible channel coding manner may be adopted according to specific conditions, which is not specifically defined.

405: The eNB calculates the number of modulation symbols occupied by the ACK/NACK, according to the first carrier set.

The first carrier set in this step is consistent with the first carrier set in step 402. If the first carrier set in step 402 is a downlink component carrier set of a user equipment, the first carrier set in this step is also the downlink component carrier set of the user equipment. The method for the eNB to calculate the number of modulation symbols occupied by the ACK/NACK according to the first carrier set is the same as that in step 402, which is not detailed herein again.

406: According to the number of modulation symbols occupied by the ACK/NACK, the eNB extracts ACK/NACK transmitted by the UE, and calculates the number of bits after channel coding corresponding to the ACK/NACK transmitted by the UE.

Because the eNB adopts the same manner as that of the UE to obtain the number of bits after channel coding corresponding to the ACK/NACK transmitted by the UE, because the eNB adopts the same manner as that of the UE to obtain the number of HARQ-ACK bits after channel coding, the number of HARQ-ACK bits after channel coding obtained by eNB is the same as the number of HARQ-ACK bits after channel coding obtained by UE.

407: The eNB performs channel decoding on the transmitted ACK/NACK according to the number of bits after channel coding corresponding to the ACK/NACK transmitted by the UE, and determines ACK/NACK corresponding to each downlink carrier according to a preset sorting rule.

Specifically, the channel decoding may be performed on the transmitted ACK/NACK by adopting a decoding method corresponding to the channel coding adopted in step 404; alternatively, the decoding may be performed by adopting any other feasible manner, which is not specifically defined. Moreover, the preset sorting rule in this step is consistent with the preset sorting rule in step 401. If the preset sorting rule in step 401 is sorting the ACK/NACK of multiple downlink carriers according to the activation sequence of the downlink carriers, the preset sorting rule in this step is also determining ACK/NACK corresponding to each downlink carrier according to the activation sequence of the downlink carriers.

It should be noted that, in this embodiment, when the eNB needs to deactivate downlink carriers, the eNB deactivates a downlink carrier included in a downlink activated carrier set according to a sequence that a carrier activated later is deactivated earlier (for example, when the ACK/NACK of the X downlink carrier(s) is sorted according to a sequence of arranging a downlink carrier activated earlier in the front, and arranging a downlink carrier activated later in the back, the eNB starts deactivation from the last downlink carrier in the downlink activated carrier set). Then, the UE repeats steps 401 to 404 to transmit the ACK/NACK of the X downlink carrier(s) according to the updated downlink activated carrier set.

It should be noted that, when ACK/NACK of the X downlink carrier(s) is sorted according to the sequence of arranging the downlink carrier activated earlier in the front, and arranging the downlink carrier activated later in the back, the ACK/NACK of a latest activated downlink carrier is arranged in the last place. The latest activated downlink carrier during a fuzzy period is usually NACK, and according to the characteristic of RM coding, the NACK arranged in the last place does not contribute to the coded bits of ACK/NACK. Therefore, even if the eNB performs decoding assuming that the number of HARQ-ACK bits transmitted by the UE is more or less than the number of HARQ-ACK bits that actually needs to be transmitted by the UE, correctness of the ACK/NACK that actually needs to be transmitted can still be ensured. For example, the downlink activated carrier set has three downlink carriers, where the last downlink carrier is a latest activated downlink carrier, and each downlink carrier supports ACK/NACK spatial bundling. Then, the total number of bits of the ACK/NACK jointly coded according to RM coding is 3. It is assumed that the first two downlink carriers both need to transmit ACK, and the last downlink carrier transmits NACK because it is just activated and has no scheduling data. Then, three bits transmitted on the PUSCH are 110, and according to the characteristic of RM coding, the bits of 110 after coding are consistent with the bits of 11 after coding. Therefore, even if the eNB does not learn that the UE has successfully detected an activation command of a downlink carrier 3 and has updated the total number of bits of the jointly coded ACK/NACK, and still decodes the transmitted ACK/NACK according to 2 bits, it is still ensured that the first 2 bits are decoded correctly.

In the method for transmitting uplink control information according to the embodiment of the present invention, the UE performs channel coding on the ACK/NACK of the X downlink carrier(s) according to the obtained number of bits after channel coding of the ACK/NACK of the UE, and transmits the ACK/NACK of the X downlink carrier(s) to the eNB, thereby solving the problem that the eNB decodes the jointly coded ACK/NACK incorrectly due to inconsistent understanding of the UE and eNB on the total number of original information bits of ACK/NACK joint coding of multiple downlink carriers. Moreover, the UE sorts the ACK/NACK of the multiple downlink carriers according to the preset sorting rule, so that the eNB may determine ACK/NACK corresponding to each downlink carrier. The UE sorts the ACK/NACK of each carrier according to an activation sequence of the downlink carriers, and the eNB deactivates a downlink carrier included in the downlink activated carrier set according to a sequence that the carrier activated later is deactivated earlier, so as to ensure that even if the eNB and the UE have inconsistent understanding on the total number of information bits of the jointly coded ACK/NACK, the ACK/NACK that truly needs to be transmitted is decoded correctly, thereby solving the problem that the eNB decodes the jointly coded ACK/NACK incorrectly due to inconsistent understanding of the UE and eNB on the total number of original information bits of the ACK/NACK joint coding of multiple downlink carriers. By use of the characteristic of the RM coding, the UE sorts the ACK/NACK of the X downlink carrier(s) according to a sequence of arranging the downlink carrier activated earlier in the front and arranging the downlink carrier activated later in the back, and always starts carrier deactivation from the last one in the activated carrier set, so as to ensure that even if the eNB and UE have inconsistent understanding on the total number of information bits of the jointly coded ACK/NACK, the ACK/NACK that truly needs to be transmitted is decoded correctly, thereby solving the problem that the base station decodes the jointly coded ACK/NACK incorrectly due to inconsistent understanding of the UE and eNB on the total number of original information bits of ACK/NACK joint coding of multiple downlink carriers. The UE calculates the number of modulation symbols occupied by the ACK/NACK of the UE according to the first carrier set, so that physical resources occupied by the ACK/NACK on the PUSCH do not change along with the downlink activated carrier set, thereby ensuring that data multiplexed with the ACK/NACK on the PUSCH is decoded correctly, and reducing the influence on data transmission performance, which, moreover, is equivalent to allocating more physical resources to the ACK/NACK to be transmitted and improving transmission performance of ACK/NACK.

For better understanding of the embodiment of the present invention, the method of the embodiment of the present invention being applied in a carrier aggregation scenario, where CSI of one or more downlink carriers is transmitted on a PUSCH, is taken as an example for further illustration.

Figure 5:
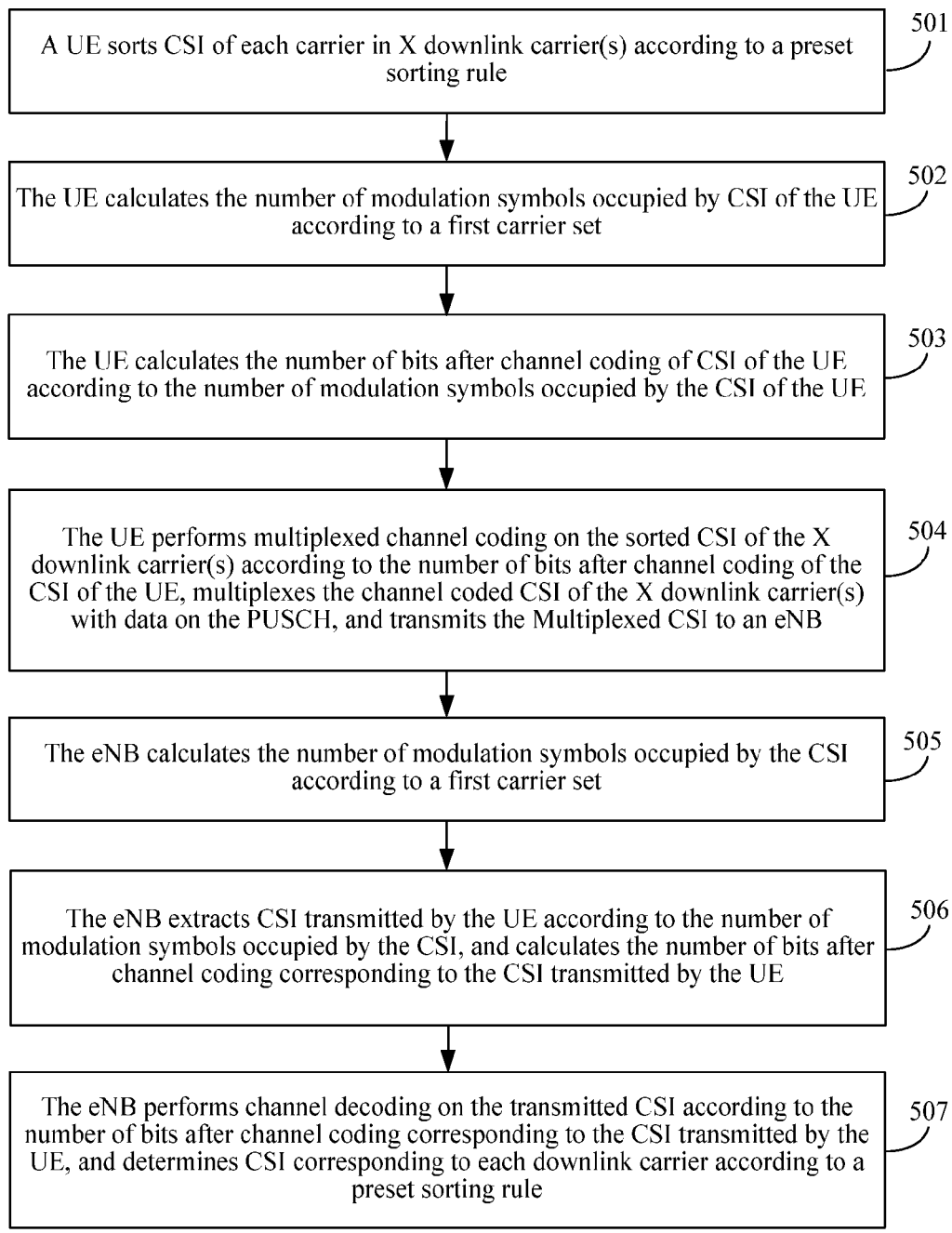
FIG. 5 is a flow chart of another method for transmitting uplink control information according to an embodiment of the present invention.

Referring to FIG. 5, an embodiment of the present invention provides another method for transmitting uplink control information, which includes the following steps.

501: A UE sorts CSI of each carrier in X downlink carrier(s) according to a preset sorting rule, where X is a positive integer, the X downlink carrier(s) exemplarily belong to a downlink activated carrier set of a UE, the X downlink carrier(s) may be determined according to the downlink activated carrier set of the UE, CSI configuration configured by higher layers and whether aperiodic CSI is to be reported.

The preset sorting rule may be performing sorting according to an activation sequence of downlink carriers, and when multiple downlink carriers are activated at the same time, CSI of the multiple downlink carriers activated at the same time may be sorted according to attributes of the downlink carriers. An attribute of a downlink carrier may be a carrier index or a carrier frequency. Specifically, CSI of the multiple downlink carriers activated at the same time may be sorted according to an increasing or a decreasing order of attributes of the downlink carriers. Alternatively, the preset sorting rule may be performing sorting according to an increasing or a decreasing order of attributes of downlink carriers corresponding to CSI, and an attribute of a downlink carrier may be a carrier index or a carrier frequency of the downlink carrier.

Specifically, the UE may determine original information of CSI of the X downlink carrier(s) in the downlink carrier set according to the downlink activated carrier set. Or, exemplarily, the UE may further determine whether CSI of each downlink carrier needs to be reported, according to the downlink activated carrier set, CSI configuration configured by higher layers and whether aperiodic CSI needs to be reported. If CSI needs to be reported, a corresponding reporting mode is further determined, thereby determining original information of CSI of the X downlink carrier(s) in the downlink carrier set and specific downlink carriers. For example, it is assumed that an updated downlink activated carrier set includes three downlink carriers, namely, CC1, CC2, and CC3 (it is assumed that CC3 is a latest activated downlink carrier). According to CSI configuration configured by higher layers, at this time, the CC1 and CC3 need to report CSI, and according to their respective upper-layer parameter configuration, the CC1 needs to report $O_1^{CSI}$ bits, and the CC3 needs to report $O_3^{CSI}$ bits. Then, the number of original information bits of CSI of the X downlink carrier(s) in the downlink carrier set is $O^{CSI}=O_1^{CSI}+O_3^{CSI}$. The downlink carriers are specifically CC1 and CC3.

502: The UE calculates the number of modulation symbols occupied by CSI of the UE according to a first carrier set.

The first carrier set may be a downlink component carrier set of a user, a maximum downlink carrier set supportable by the UE, or a smaller one of the downlink component carrier set of the user and the maximum downlink carrier set supportable by the UE. Specifically, the UE may calculate the number of modulation symbols occupied by CSI of the UE, according to the first carrier set. Or, exemplarily, the UE may calculate the number of modulation symbols occupied by CSI of the UE, according to the first carrier set, CSI configuration configured by higher layers and whether aperiodic CSI needs to be reported, and by utilizing Formula (3).

$$Q' = \min\left(\left\lceil \frac{(O+L) \cdot M_{sc}^{PUSCH-initial} \cdot N_{symb}^{PUSCH-initial} \cdot N_{layer} \cdot \beta_{offset}^{PUSCH}}{\sum_{r=0}^{C-1} K_r} \right\rceil, \quad (3)\right.$$

$$\left. M_{sc}^{PUSCH} \cdot N_{symb}^{PUSCH} \cdot N_{layer} - \frac{Q_{RI}}{Q_m} \right)$$

Q' indicates the number of modulation symbols occupied by CSI of the UE. O indicates the total number of information bits of all CSI corresponding to the first carrier set, and is calculated based on CSI configuration configured by higher layers, whether aperiodic CSI is to be reported, and a CSI reporting mode configured by an upper layer for a downlink carrier whose CSI needs to be reported. $N_{layer}$ indicates the total number of layers corresponding to code words to which CSI is mapped. $M_{sc}^{PUSCH-initial}$ indicates the transmission bandwidth of a PUSCH occupied by the same transmission block during initial transmission. $M_{sc}^{PUSCH}$ indicates the transmission bandwidth of the PUSCH corresponding to the current subframe. $N_{symb}^{PUSCH-initial}$ indicates the number of SC-FDMA symbols occupied by the same transmission block during initial transmission. $N_{symb}^{PUSCH}$ indicates the number of SC-FDMA symbols occupied by the current subframe. L indicates the number of CRC bits, where the value of L is 0 during RM coding of CQI, and the value of L is 8 during convolutional coding of the CQI. $\beta_{offset}^{PUSCH}$ indicates the offset of CSI relative to the data MCS, where $\beta_{offset}^{PUSCH} = \beta_{offset}^{CSI}$, and the value of $\beta_{offset}^{CSI}$ is notified by upper-layer RRC signaling. C indicates the number of code blocks. $K_r$ indicates a sum of the number of information bits of an r th code block and the number of CRC check bits.

503: The UE calculates the number of bits after channel coding of CSI of the UE according to the number of modulation symbols occupied by CSI of the UE.

Specifically, the number of bits after channel coding of CSI of the UE is calculated according to the number of modulation symbols Q' occupied by CSI of the UE obtained in step 502 and by utilizing Formula (4).

$$Q = Q_m \cdot Q'' \quad (4)$$

where Q' indicates the number of modulation symbols occupied by CSI of the UE; Q indicates the number of bits after channel coding of CSI of the UE; $Q_m$ indicates a modulation order.

504: The UE performs channel coding for the sorted CSI of the X downlink carrier(s) according to the number of bits after channel coding of CSI of the UE, multiplexes the channel coded CSI of the X downlink carrier(s) and data on the PUSCH, and transmits the multiplexed CSI to an eNB.

Specifically, exemplarily, in the embodiment of the present invention, if the number $O^{CSI}$ of original information bits of CSI of the X downlink carrier(s) is smaller than or equal to 11 bits, RM coding is adopted, and if greater than 11 bits, convolutional coding is adopted. Any other feasible coding method may be set according to actual application conditions, which is not specifically defined.

505: The eNB calculates the number of modulation symbols occupied by CSI, according to a first carrier set.

The first carrier set in this step is consistent with the first carrier set in step 502. If the first carrier set in step 502 is the downlink component carrier set of the user, and the first carrier set in this step is also the downlink component carrier set of the user. The method for the eNB to calculate the number of modulation symbols occupied by CSI according to the first carrier set is the same as that in step 502, which is not detailed herein again.

506: According to the number of modulation symbols occupied by CSI, the eNB extracts CSI transmitted by the UE, and calculates the number of bits after channel coding corresponding to CSI transmitted by the UE.

Because the eNB adopts the same manner as that of the UE to obtain the number of bits after channel coding corresponding to CSI transmitted by the UE, the number of HARQ-ACK bits after channel coding obtained by eNB is the same as the number of HARQ-ACK bits after channel coding obtained by UE.

507: The eNB performs channel decoding on the transmitted CSI according to the number of bits after channel coding corresponding to CSI transmitted by the UE, and determines CSI corresponding to each downlink carrier according to a preset sorting rule.

Specifically, the channel decoding method may be blind detection. The blind detection method refers to that: after receiving the transmitted CSI information, the eNB may perform blind decoding on CSI according to possible changes of the activated carrier set before or after carrier activation/deactivation, that is, determine multiple activated carrier sets according to possible changes of the activated carrier set before or after carrier activation/deactivation, calculate the number of original information bits of joint coding according to each of the determined activated carrier sets and based on the method in step 501, then perform channel decoding in combination with the calculated number of bits of CSI after joint channel coding, and determine the decoding that is with correct CRC check or a maximum likelihood function as the output of decoding output. Alternatively, any other feasible method may be adopted for decoding, which is not specifically defined.

Moreover, the preset sorting rule in this step is consistent with the preset sorting rule in step 501. If the preset sorting rule in step 501 is sorting CSI of multiple downlink carriers according to the activation sequence of the downlink carriers, the preset sorting rule in this step is also determining CSI corresponding to each downlink carrier according to the activation sequence of the downlink carriers, and CSI corresponding to each downlink carrier is determined according to this sequence.

In the method for transmitting uplink control information according to the embodiment of the present invention, the UE performs channel coding on CSI of the X downlink carrier(s) according to the obtained number of bits after channel coding of CSI of the UE, and transmits CSI of the X downlink carrier(s) to the eNB, thereby solving the problem that the eNB decodes the jointly coded CSI incorrectly due to inconsistent understanding of the UE and eNB on the total number of original information bits of CSI joint coding of multiple downlink carriers. Moreover, the UE sorts CSI of multiple downlink carriers according to the preset sorting rule, so that the eNB may determine CSI corresponding to each downlink carrier. Through blind detection, the eNB may further solve the problem that the eNB decodes the jointly coded CSI incorrectly due to inconsistent understanding of the UE and eNB on the total number of original information bits of CSI joint coding of the multiple downlink carriers. The UE calculates the number of modulation symbols occupied by CSI of the UE according to the first carrier set, so that physical resources occupied by CSI on the PUSCH do not change along with the downlink activated carrier set, thereby ensuring that data multiplexed with CSI on the PUSCH is decoded normally, and reducing the influence on data transmission performance, which, moreover, is equivalent to allocating more physical resources to CSI to be transmitted and improving transmission performance of CSI.

It should be noted that, modification may be made to step 401 or 501 and step 402 or 502 based on the embodiment shown in FIG. 4 or embodiment shown in FIG. 5, so as to solve the problem that the eNB incorrectly decodes UCI after joint channel coding due to inconsistent understanding, resulted from reconfiguration of the downlink component carrier set of the user through RRC signaling, of the UE and eNB on the number of original information bits of UCI joint channel coding of multiple downlink carriers. The modified step 401 or 501 is specifically as follows:

When a UE detects reconfiguration RRC signaling of the DL CC set, the UE updates a downlink activated carrier set; the UE sorts UCI of each downlink carrier in X downlink carrier(s) according to a preset sorting rule, where X is a positive integer, the X downlink carrier(s) belong to the downlink activated carrier set updated by the UE, and the X downlink carrier(s) herein are all downlink carriers in the downlink carrier set updated by the UE.

The modified step 402 or 502 is specifically as follows:

The UE calculates the number of modulation symbols occupied by UCI of the UE according to a first carrier set, where the first carrier set is a maximum downlink carrier set supportable by the UE, or a smaller one of the maximum downlink carrier set supportable by the UE and a maximum downlink carrier set currently supportable by the eNB.

Other processes are similar to that in Embodiment 5 or 6, which are not detailed herein again.

In the method for transmitting uplink control information according to the embodiment of the present invention, the UE performs channel coding on UCI of the X downlink carrier(s) according to the obtained number of bits after channel coding of UCI of the UE, and transmits UCI of the X downlink carrier(s) to the eNB, thereby solving the problem that the eNB decodes the jointly coded UCI incorrectly due to inconsistent understanding of the UE and eNB on the total number of original information bits of UCI joint coding of multiple downlink carriers. Moreover, the UE sorts UCI of multiple downlink carriers according to the preset sorting rule, so that the eNB may determine UCI corresponding to each downlink carrier. Through a specific sorting sequence of UCI or blind detection, the eNB may further solve the problem that the eNB decodes the jointly coded UCI incorrectly due to inconsistent understanding of the UE and eNB on the total number of original information bits of UCI joint coding of the multiple downlink carriers. The UE calculates the number of modulation symbols occupied by UCI of the UE according to the first carrier set, so that physical resources occupied by UCI on the PUSCH do not change along with the downlink activated carrier set, thereby ensuring that data multiplexed with UCI on the PUSCH is decoded correctly, and reducing the influence on data transmission performance, which, moreover, is equivalent to allocating more physical resources to UCI to be transmitted and improving transmission performance of UCI. After the UE detects the reconfiguration RCC signaling of the DL CC set, the UE updates the downlink activated carrier set, and performs transmission similar to that of the embodiment shown in FIG. 4 or FIG. 5 based on the updated downlink activated carrier set. The maximum downlink carrier set supportable by the UE, or a smaller one of the maximum downlink carrier set supportable by the UE and the maximum downlink carrier set currently supportable by the eNB is adopted as the first carrier set, thereby solving the problem that the eNB incorrectly decodes UCI after joint channel coding due to inconsistent understanding, which is resulted from reconfiguration of the downlink component carrier set of the user through RRC signaling, of the UE and the eNB on the number of original information bits of UCI joint channel coding of multiple downlink carriers.

For better understanding of the embodiment of the present invention, the method of the embodiment of the present invention being applied in a carrier aggregation scenario, where ACK/NACK of one or more downlink carriers is transmitted on a PUCCH through multiplexing (Multiplexing), is taken as an example for further illustration.

Figure 6:
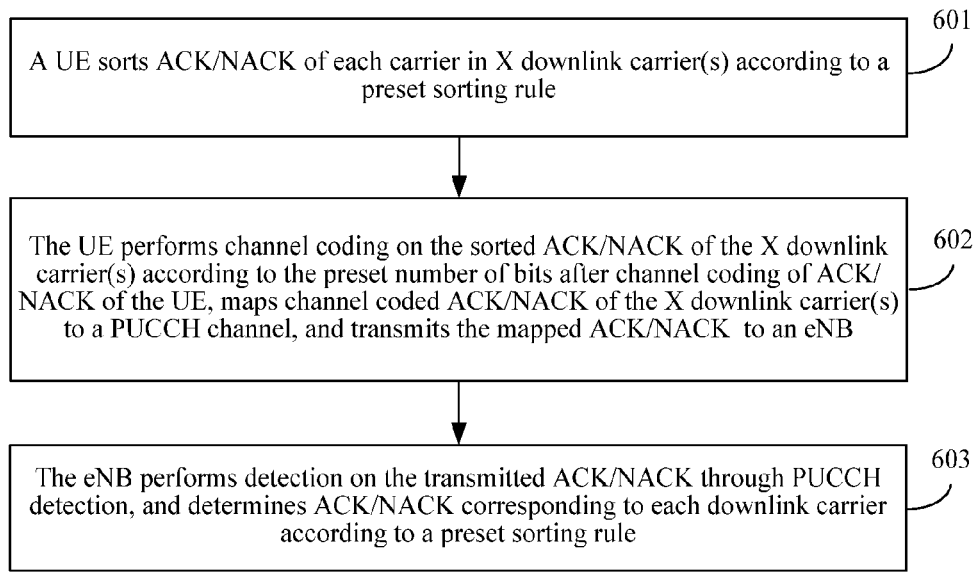
FIG. 6 is a flow chart of another method for transmitting uplink control information according to an embodiment of the present invention.

Referring to FIG. 6, an embodiment of the present invention provides another method for transmitting uplink control information, which includes the following.

601: A UE sorts ACK/NACK of each carrier in X downlink carrier(s) according to a preset sorting rule, where X is a positive integer, the X downlink carrier(s) belong to a downlink activated carrier set of the UE, and the X downlink carrier(s) are all downlink carriers in a downlink carrier set of the UE.

The preset sorting rule may be performing sorting according to an activation sequence of downlink carriers, and when multiple downlink carriers are activated at the same time, the ACK/NACK of the multiple downlink carriers activated at the same time may be sorted according to attributes of the downlink carriers corresponding to ACK/NACK of the downlink carriers. An attribute of a downlink carrier may be a carrier index or a carrier frequency of the downlink carrier. Specifically, the ACK/NACK of the multiple downlink carriers activated at the same time may be sorted according to an increasing or a decreasing order of attributes of the downlink carriers.

Specifically, for each downlink carrier in the X downlink carriers, if the ACK/NACK is required to be fed back, and the ACK/NACK supports spatial bundling, each downlink carrier corresponds to 1-bit ACK or NACK; if the ACK/NACK is required to be fed back, and the ACK/NACK does not support spatial bundling, each downlink carrier corresponds to 2-bit ACK or NACK. If the ACK/NACK is not required to be fed back, and the ACK/NACK supports spatial bundling, each downlink carrier corresponds to 1-bit NACK; if the ACK/NACK is not required to be fed back, and the ACK/NACK does not support spatial bundling, each downlink carrier corresponds to 2-bit NACK. The requiring the ACK/NACK to be fed back refers to that information of requiring the ACK/NACK to be fed back, such as data or PDCCH signaling indicating release of downlink SPS resources, is detected on the carrier.

The UE determines original information of the ACK/NACK of each downlink carrier in the X downlink carrier(s) according to the foregoing method, so that the total number of original information bits $O^{ACK}$ in the X downlink carrier(s) is: $O^{ACK}=X$ or $O^{ACK}=2X$. X corresponds to a scenario where the ACK/NACK supports spatial bundling, and 2X corresponds to a scenario where the ACK/NACK does not support spatial bundling.

602: The UE performs channel coding for the sorted ACK/NACK of the X downlink carrier(s) according to the preset number of bits after channel coding of ACK/NACK of the UE, maps the channel coded ACK/NACK of the X downlink carriers after channel coding to a PUCCH channel, and transmits the mapped ACK/NACK to an eNB.

The preset number of bits after channel coding of the ACK/NACK of the UE is a positive integer, which, for example, may be 20. In addition, in this embodiment of the present invention, exemplarily, RM coding is adopted for channel coding, and in actual applications, any other feasible channel coding manner may be adopted according to specific conditions, which is not specifically defined.

603: The eNB performs detection on the transmitted ACK/NACK through PUCCH detection, and determines ACK/NACK corresponding to each downlink carrier according to a preset sorting rule.

The preset sorting rule in this step is consistent with the preset sorting rule in step 601. Moreover, specifically, a channel decoding method during the process of detecting the transmitted ACK/NACK by the eNB may be: performing channel decoding on the transmitted ACK/NACK by adopting a method corresponding to that of the coding in step 602 and according to the preset number of bits after channel coding; or performing decoding through a blind decoding method, where the blind decoding method refers to that: after receiving the transmitted ACK/NACK information, the eNB may perform blind decoding on the ACK/NACK according to possible changes of the downlink activated carrier set before or after carrier activation/deactivation, that is, determine multiple downlink activated carrier sets according to possible changes of the downlink activated carrier set before or after carrier activation/deactivation, perform channel decoding according to each of the determined downlink activated carrier sets and in combination with the preset number of bits after channel coding, and determine the decoding that is with a maximum likelihood function as the output of decoding.

It should be noted that, if the eNB does not adopt the blind decoding to decode the transmitted ACK/NACK, when the eNB needs to deactivate a downlink carrier, the eNB deactivates a carrier included in the downlink activated carrier set, according to a sequence that a carrier activated later is deactivated earlier. Then, according to the updated downlink activated carrier set, the UE repeats steps 601 and 602 to transmit the ACK/NACK of the X downlink carriers.

It should be noted that, when the ACK/NACK of the X downlink carrier(s) is sorted according to the sequence of arranging a downlink carrier activated earlier in the front, and arranging a downlink carrier activated later in the back, the ACK/NACK of the latest activated downlink carrier is arranged in the last place. The latest activated downlink carrier during a fuzzy period is usually NACK, and according to the characteristic of RM coding, the NACK arranged in the last place does not contribute to the coded bits of ACK/NACK. Therefore, even if the eNB performs decoding based on less or more bits, correctness of the ACK/NACK that truly needs to be transmitted can still be ensured. For example, the downlink activated carrier set has three downlink carriers, where the last downlink carrier is the latest activated downlink carrier, and each downlink carrier supports ACK/NACK spatial bundling. Then, the total number of bits of the ACK/NACK jointly coded according to RM coding is 3. It is assumed that the first two downlink carriers both need to transmit ACK, and the last downlink carrier transmits NACK because it is just activated and has no scheduling data. Then, three bits transmitted on the PUSCH are 110, and according to the characteristic of RM coding, the bits of 110 after coding are consistent with the bits of 11 after coding. Therefore, even if the eNB does not learn that the UE has successfully detected an activation command of a downlink carrier 3 and has updated the total number of bits of the jointly coded ACK/NACK, and still decodes the transmitted ACK/NACK based on 2 bits, it is still ensured that the first 2 bits are decoded correctly.

In the method for transmitting uplink control information according to the embodiment of the present invention, the UE performs channel coding on the ACK/NACK of the X downlink carrier(s) according to the preset number of bits after channel coding of ACK/NACK of the UE, and transmits the ACK/NACK of the X downlink carrier(s) to the eNB, thereby solving the problem that the eNB decodes the jointly coded ACK/NACK incorrectly due to inconsistent understanding of the UE and eNB on the total number of original information bits of ACK/NACK joint coding of multiple downlink carriers. Moreover, the UE sorts the ACK/NACK of multiple downlink carriers according to the preset sorting rule, so that the eNB may determine ACK/NACK corresponding to each downlink carrier. Further, when the eNB does not adopt blind decoding, the UE sorts the ACK/NACK of each carrier by utilizing the characteristic of RM coding and according to an activation sequence of the downlink carriers, and the eNB deactivates a downlink carrier included in the downlink activated carrier set according to the sequence that a carrier activated later is deactivated earlier, thereby ensuring the correct decoding of the ACK/BACK that truly needs to be transmitted even if the eNB and UE have inconsistent understanding on the total number of information bits of the jointly coded ACK/NACK, and solving the problem that the eNB decodes the jointly coded ACK/NACK incorrectly due to inconsistent understanding of the UE and eNB on the total number of original information bits of ACK/NACK joint coding of multiple downlink carriers. If the eNB adopts the blind detection, the sequence of deactivating the carriers does not need to be confined, and the problem that the eNB decodes the jointly coded ACK/NACK incorrectly due to inconsistent understanding of the UE and eNB on the total number of original information bits of ACK/NACK joint coding of multiple downlink carriers can be further solved.

Figure 7:
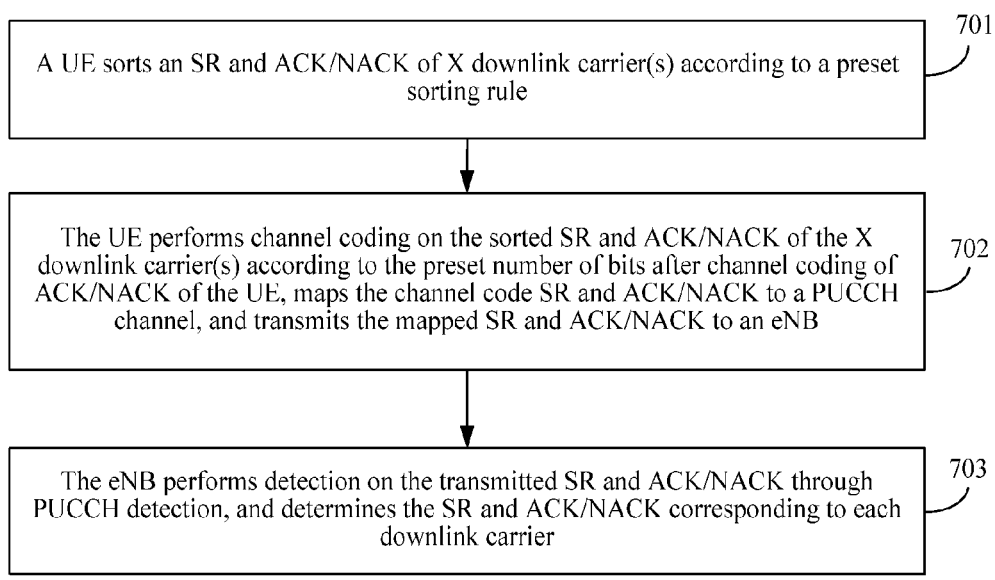
FIG. 7 is a flow chart of another method for transmitting uplink control information according to an embodiment of the present invention.

When the UE has uplink data required to be sent but has no uplink resources, the UE sends an SR (Scheduling Request) to the eNB to request resource allocation. In the carrier aggregation scenario, a specific uplink carrier of the UE is semi-statically configured to send the SR and ACK/NACK. When the SR and the ACK/NACK of the X downlink carrier(s) are reported on the same uplink frame at the same time, the SR and the ACK/NACK of the X downlink carrier(s) may undergo joint channel coding before being transmitted. Based on the foregoing scenario, referring to FIG. 7, an embodiment of the present invention provides another method for transmitting uplink control information, where the method includes the following.

701: A UE sorts an SR and ACK/NACK of X downlink carrier(s) according to a preset sorting rule, where X is a positive integer, the X downlink carrier(s) belong to a downlink activated carrier set of the UE, and the X downlink carrier(s) herein are all downlink carriers in a downlink carrier set of the UE.

The preset sorting rule in the embodiment of the present invention is: performing sorting according to a sequence of arranging the SR first, and then arranging the ACK/NACK of each downlink carrier in the X downlink carrier(s) after the SR based on an activation sequence of the downlink carriers. Moreover, when multiple downlink carriers are activated at the same time, ACK/NACK of the multiple downlink carriers activated at the same time may be sorted according to attributes of the downlink carriers corresponding to ACK/NACK of the downlink carriers. An attribute of a downlink carrier may be a carrier index or a carrier frequency of the downlink carrier. Specifically, the ACK/NACK of the multiple downlink carriers activated at the same time may be sorted according to an increasing or a decreasing order of the attributes of the downlink carriers.

Specifically, for each downlink carrier in the X downlink carriers, if ACK/NACK is required to be fed back, and the ACK/NACK supports spatial bundling, each downlink carrier corresponds to 1-bit ACK or NACK; if the ACK/NACK is required to be fed back, and the ACK/NACK does not support spatial bundling, each downlink carrier corresponds to 2-bit ACK or NACK. If the ACK/NACK is not required to be fed back, and the ACK/NACK supports spatial bundling, each downlink carrier corresponds to 1-bit NACK; if the ACK/NACK is not required to be fed back, and the ACK/NACK does not support spatial bundling, each downlink carrier corresponds to 2-bit NACK. The requiring the ACK/NACK to be fed back refers to that information of requiring the ACK/NACK to be fed back, such as data or PDCCH signaling indicating release of downlink SPS resources, is detected on the carrier.

The UE determines original information of the ACK/NACK of each downlink carrier in the X downlink carrier(s) according to the foregoing method, so that the total number of original information bits $O^{ACK}$ in the X downlink carrier(s) is: $O^{ACK}$=X or $O^{ACK}$=2X. X corresponds to a scenario where the ACK/NACK supports spatial bundling, and 2X corresponds to a scenario where the ACK/NACK does not support spatial bundling. The total number of original information bits of joint coding is obtained according to the total number of original information bits in the X downlink carrier(s) and original information of the SR.

702: The UE performs channel coding for the sorted SR and ACK/NACK of the X downlink carrier(s) according to the preset number of bits after channel coding of ACK/NACK of the UE, maps the channel coded SR and ACK/NACK to a PUCCH channel, and transmits the mapped SR and ACK/NACK to an eNB.

Step 702 is similar to step 602, which is not detailed herein again.

703: The eNB performs detection on the transmitted SR and ACK/NACK through PUCCH detection, and determines the SR and ACK/NACK that is corresponding to each downlink carrier.

Step 703 is similar to step 603, which is not detailed herein again.

With the method for transmitting uplink control information according to the embodiment of the present invention, not only the problem similar to that of the embodiment shown in FIG. 6 is solved, but also correct transmission of the SR is ensured.

Figure 8:
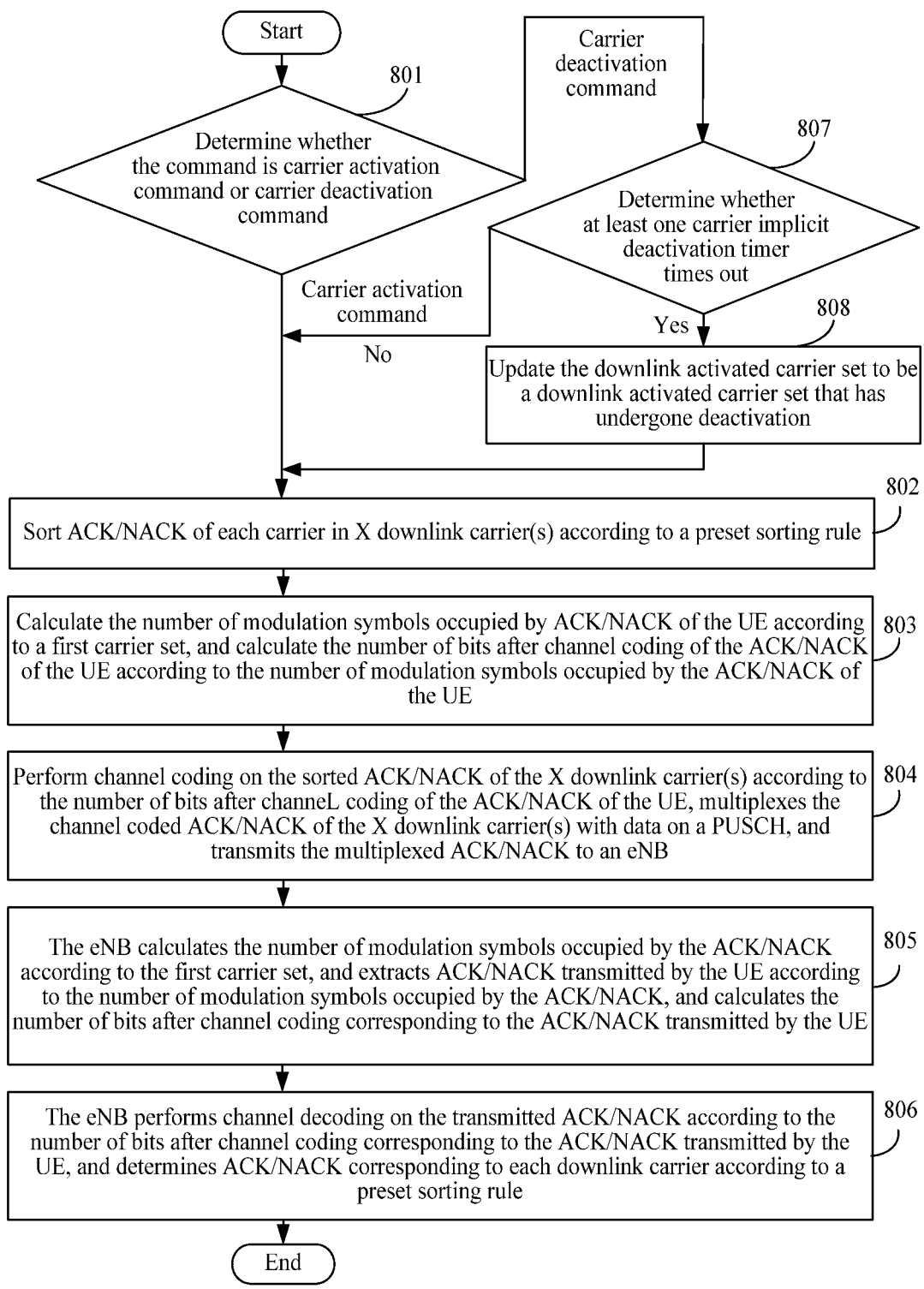
FIG. 8 is a flow chart of another method for transmitting uplink control information according to an embodiment of the present invention.

Referring to FIG. 8, an embodiment of the present invention provides another method for transmitting uplink control information, which includes the following.

801: A UE receives carrier activation command/deactivation command, and determines whether to activate a carrier and/or deactivate a carrier; for an activated carrier, adds the newly activated carrier to an original downlink activated carrier set and performs 802; and for a deactivated carrier, performs 807.

802: The UE sorts ACK/NACK of each carrier in X downlink carrier(s) according to a preset sorting rule.

Step 802 is similar to step 401, which is not detailed herein again.

803: The UE calculates, according to a first carrier set, the number of modulation symbols occupied by ACK/NACK of the UE; and the UE calculates the number of bits after channel coding of the ACK/NACK of the UE according to the number of modulation symbols occupied by the ACK/NACK of the UE.

Step 803 is similar to step 402 and step 403, which is not detailed herein again.

804: The UE performs channel coding for the sorted ACK/NACK of the X downlink carrier(s) according to the number of bits after channel coding of the ACK/NACK of the UE, multiplexes the channel coded ACK/NACK of the X downlink carrier(s) with data on a PUSCH, and transmits the multiplexed ACK/NACK of the X downlink carrier(s) after channel coding to an eNB.

Step 804 is similar to step 404, which is not detailed herein again.

805: The eNB calculates, according to the first carrier set, the number of modulation symbols occupied by the ACK/NACK; and the eNB extracts, according to the number of modulation symbols occupied by the ACK/NACK, ACK/NACK transmitted by the UE, and calculates the number of bits after channel coding corresponding to the ACK/NACK transmitted by the UE.

Step 805 is similar to step 405 and step 406, which is not detailed herein again.

806: The eNB performs channel decoding on the transmitted ACK/NACK according to the number of bits after channel coding corresponding to the ACK/NACK transmitted by the UE, and determines ACK/NACK corresponding to each downlink carrier according to a preset sorting rule.

Step 806 is similar to step 407, which is not detailed herein again.

807: The UE determines whether at least one carrier implicit deactivation timer times out; if at least one carrier implicit deactivation timer times out, performs 808; otherwise, performs 802.

808: The UE updates the downlink activated carrier set to be the downlink activated carrier set that has undergone deactivation, and performs 802.

In the method for transmitting uplink control information according to the embodiment of the present invention, for the case of carrier activation, by utilizing the characteristic of RM coding, the UE sorts the ACK/NACK of each carrier according to the activation sequence of the carriers, and always starts carrier deactivation from the last one in the activated carrier set, so as to ensure that even if the base station and the UE have inconsistent understanding on the total number of information bits of the jointly coded ACK/NACK, the ACK/NACK that truly needs to be transmitted is also correctly decoded, thereby solving the problem that the base station decodes the jointly coded ACK/NACK incorrectly due to inconsistent understanding of the UE and eNB on the total number of original information bits of ACK/NACK joint coding of multiple downlink carriers. Meanwhile, the UE calculates, according to the first carrier set, the number of modulation symbols occupied by the ACK/NACK of the X downlink carriers, so that physical resources occupied by the ACK/NACK on the PUSCH do not change along with the downlink activated carrier set, so as to ensure that the data multiplexed with the ACK/NACK on the PUSCH is decoded correctly, and the influence on data transmission performance is reduced, which, moreover, is equivalent to allocating more physical resources to the ACK/NACK to be transmitted and improving transmission performance of the ACK/NACK. For the case of carrier deactivation, in combination with the implicit mechanism of carrier deactivation, the problem that the base station decodes the jointly coded ACK/NACK incorrectly due to inconsistent understanding of the UE and eNB on the total number of original information bits of ACK/NACK joint coding of multiple downlink carriers is solved.

Figure 9:
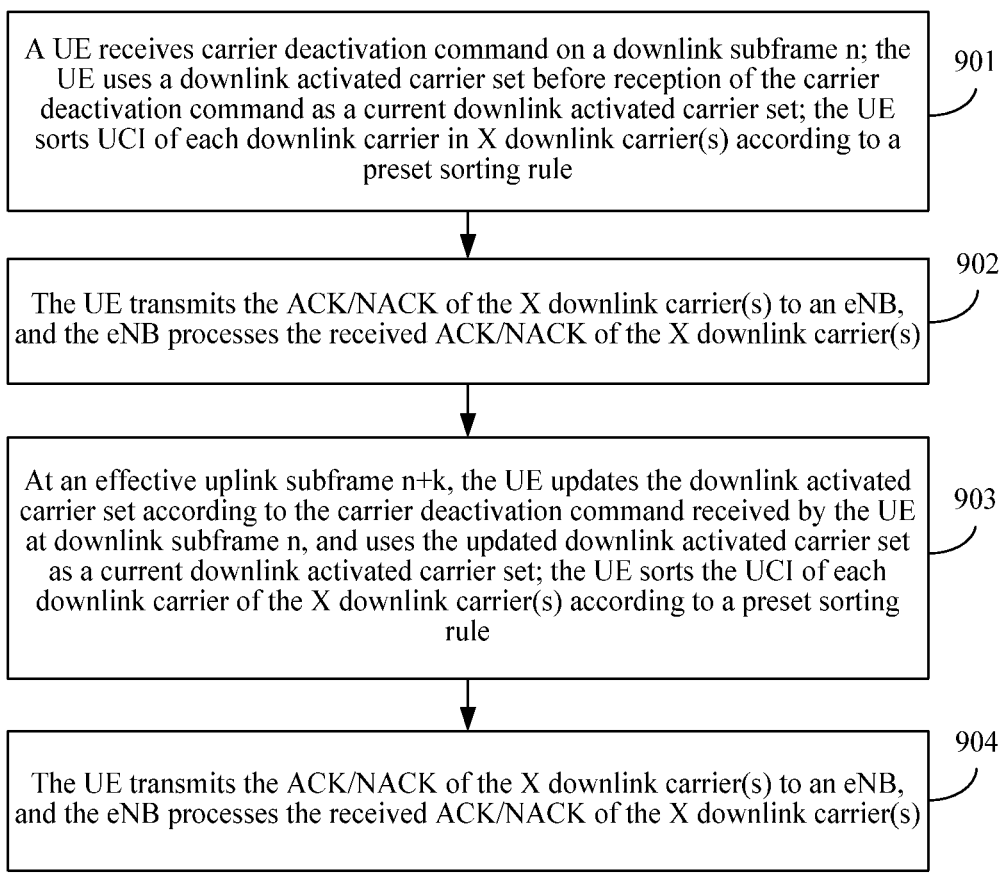
FIG. 9 is a flow chart of another method for transmitting uplink control information according to an embodiment of the present invention.

Referring to FIG. 9, an embodiment of the present invention provides another method for transmitting uplink control information, which includes the following.

901: A UE receives carrier activation/deactivation command in a downlink subframe n; the UE uses a downlink activated carrier set before reception of the carrier activation command/deactivation command as a current downlink activated carrier set; the UE sorts UCI of each downlink carrier in X downlink carrier(s) according to a preset sorting rule, where X is a positive integer, and the X downlink carrier(s) belong to the current downlink activated carrier set of the UE.

Specifically, when UCI is ACK/NACK, the X downlink carrier(s) are all downlink carriers in the downlink carrier set of the UE; when UCI is CSI, the X downlink carrier(s) may be determined according to the downlink activated carrier set of the UE, CSI configuration configured by higher layers and whether aperiodic CSI is to be reported.

The process that the UE sorts UCI of each downlink carrier in the X downlink carrier(s) according to the preset sorting rule is similar to step 401 when UCI is ACK/NACK, and is similar to step 501 when UCI is CSI, which is not described in detail herein again.

902: The UE transmits UCI of the X downlink carrier(s) to an eNB, and the eNB processes the received UCI of the X downlink carriers.

Specifically, when UCI is ACK/NACK, step 902 may be implemented by adopting the method of steps 402 to 407 or steps 602 and 603. When UCI is CSI, step 902 may be implemented by adopting the method of steps 502 to 507.

It should be noted that, when the UE adopts the method similar to step 402 or 502 to calculate the number of modulation symbols occupied by UCI of the UE in this step, the first carrier set may further be the downlink activated carrier set before the carrier activation command/deactivation command is sent on the downlink subframe n; when the eNB adopts the method similar to step 405 or 505 to calculate the number of modulation symbols occupied by UCI in this step, the first carrier set may further be the downlink activated carrier set before the eNB sends the carrier activation/deactivation command in the downlink subframe n.

903: Starting from a first effective uplink subframe n+k, the UE uses the updated downlink activated carrier set (that is, the downlink activated carrier set updated after the UE receives the carrier activation/deactivation command in the downlink subframe n) as a current downlink activated carrier set, and the UE sorts UCI of each downlink carrier in the X downlink carrier(s) according to a preset sorting rule, where X is a positive integer, and the X downlink carrier(s) belong to the current downlink activated carrier set of the UE. k indicates the number of delayed subframes, and k is a positive integer.

The first effective uplink subframe n+k refers to a first uplink subframe which needs to report UCI and which the UE encounters after k subframes since the subframe n on which the UE receives the carrier activation command/deactivation command. A specific value of k may be selected according to an actual situation, for example, k is greater than or equal to 5.

Specifically, when UCI is ACK/NACK, the X downlink carrier(s) are all downlink carriers in the downlink carrier set of the UE; when UCI is CSI, the X downlink carrier(s) may be determined according to the downlink activated carrier set of the UE, CSI configuration configured by higher layers and whether aperiodic CSI is to be reported.

The process that the UE sorts UCI of each downlink carrier in the X downlink carrier(s) according to the preset sorting rule is similar to step 401 when UCI is ACK/NACK, and is similar to step 501 when UCI is CSI, which is not described in detail herein again.

It should be noted that, in this step, starting from the first effective uplink subframe n+k, the UE uses the updated downlink activated carrier set (that is, the downlink activated carrier set updated after the UE receives the carrier activation/deactivation command in the downlink subframe n) as the current downlink activated carrier set, until the update needs to be performed again according to new carrier activation command/deactivation command.

904: The UE transmits UCI of the X downlink carrier(s) to an eNB, and the eNB processes the received UCI of the X downlink carriers.

Specifically, when UCI is ACK/NACK, step 904 may be implemented by adopting the method of steps 401 to 407 or steps 601 to 603. When UCI is CSI, step 904 may be implemented by adopting the method of steps 501 to 507.

In the method for transmitting uplink control information according to the embodiment of the present invention, when the UE reports UCI, by delaying effective time of the carrier activation command/deactivation command, the problem that the base station decodes the jointly coded UCI incorrectly due to inconsistent understanding of the UE and eNB on the total number of original information bits of UCI joint coding of multiple downlink carriers is solved.

Figure 10:
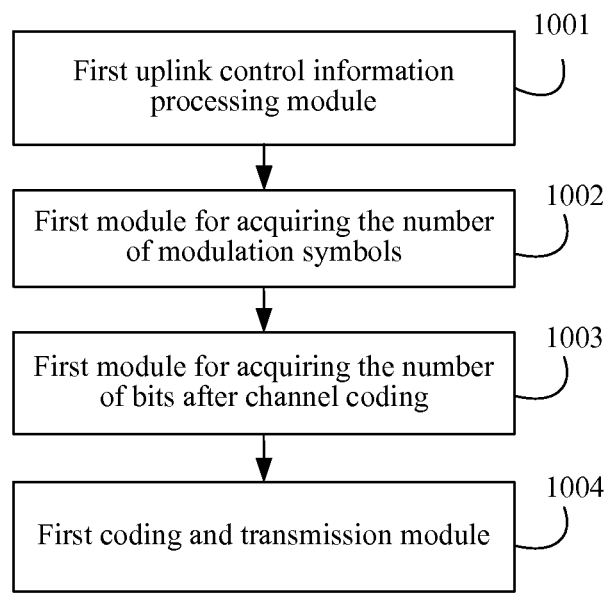
FIG. 10 is a schematic structural diagram of a user equipment according to an embodiment of the present invention.

Referring to FIG. 10, an embodiment of the present invention provides an user equipment, where the user equipment includes: a first uplink control information processing module 1001, configured to sort UCI of each downlink carrier in X downlink carrier(s) according to a preset sorting rule, where X is a positive integer, the X downlink carrier(s) belong to a downlink component carrier set of the user equipment, the downlink component carrier set of the user equipment at least includes two downlink component carriers, and at least one downlink carrier in the X downlink carrier(s) belongs to a downlink activated carrier set of the user equipment; a first module for acquiring the number of modulation symbols 1002, configured to calculate the number of modulation symbols occupied by UCI of the user equipment according to a first carrier set, where the first carrier set is one of the following sets: the downlink component carrier set of the user equipment, a maximum downlink carrier set supportable by the user equipment, and a smaller one of the downlink component carrier set of the user equipment and the maximum downlink carrier set supportable by the user equipment; a first module for acquiring the number of bits after channel coding 1003, configured to: after the first module for acquiring the number of modulation symbols 1002 obtains the number of modulation symbols occupied by UCI of the user equipment, calculate the number of bits after channel coding of UCI of the user equipment according to the number of modulation symbols occupied by UCI of the user equipment; and a first coding and transmission module 1004, configured to: after the first module for acquiring the number of bits after channel coding 1003 obtains the number of bits after channel coding of UCI of the user equipment, perform channel coding for the sorted UCI of the X downlink carrier(s) according to the number of bits after channel coding of UCI of the user equipment, map the sorted UCI of the X downlink carrier(s) after channel coding to a physical channel and transmit the sorted UCI of the X downlink carrier(s) to an eNB.

Further, the first uplink control information processing module 1001 is specifically configured to: when UCI of the user equipment is hybrid automatic repeat request HARQ acknowledgment information, sort UCI of all downlink carriers in the downlink activated carrier set according to the preset sorting rule.

Further, the first uplink control information processing module 1001 is specifically configured to: when UCI of the user equipment is channel state information CSI, sort, according to the preset sorting rule, UCI of each downlink carrier in the X downlink carrier(s) that are determined according to CSI configuration configured by higher layers and whether aperiodic CSI is to be reported, where the X downlink carrier(s) belong to the downlink activated carrier set of the user equipment.

Further, the first uplink control information processing module 1001 includes one of the following units: a first sorting unit, configured to sort UCI of each downlink carrier in the X downlink carrier(s) according to an increasing order of attributes of downlink carriers corresponding to UCI of the downlink carriers, where an attribute of a downlink carrier is a carrier index or a carrier frequency; a second sorting unit, configured to sort UCI of each downlink carrier in the X downlink carrier(s) according to a decreasing order of attributes of downlink carriers corresponding to UCI of the downlink carriers, where an attribute of a downlink carrier is a carrier index or a carrier frequency; a third sorting unit, configured to sort UCI of each downlink carrier in the X downlink carrier(s) according to an activation sequence of the downlink carriers.

Further, the third sorting unit is specifically configured to: when UCI of each downlink carrier in the X downlink carrier(s) is sorted according to the activation sequence of the downlink carriers, if multiple downlink carriers are activated at the same time, sort UCI of the multiple downlink carriers activated at the same time, according to the increasing or decreasing order of the attributes of the downlink carriers, where the attribute of the downlink carrier is a carrier index or a carrier frequency.

Further, the first module for acquiring the number of modulation symbols 1002 includes: a unit for calculating the number of modulation symbols, configured to: when UCI is channel state information CSI, calculate the number of modulation symbols occupied by CSI of the user equipment, according to the first carrier set, CSI configuration configured by higher layers and whether aperiodic CSI is to be reported.

In the user equipment according to the embodiment of the present invention, the user equipment performs channel coding on UCI of the X downlink carrier(s) according to the acquired number of bits after channel coding of UCI of the user equipment, and transmits UCI of the X downlink carrier(s) to a base station, thereby solving the problem that the base station decodes the jointly coded UCI incorrectly due to inconsistent understanding of the user equipment and base station on the total number of original information bits of UCI joint coding of multiple downlink carriers. Moreover, the user equipment sorts UCI of the multiple downlink carriers according to the preset sorting rule, so that the base station may determine UCI corresponding to each downlink carrier.

Figure 11:
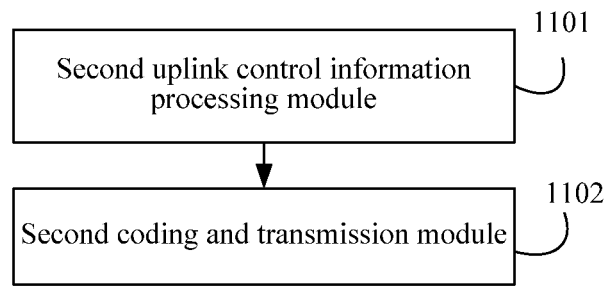
FIG. 11 is a schematic structural diagram of another user equipment according to an embodiment of the present invention.

Referring to FIG. 11, an embodiment of the present invention provides another user equipment, where the user equipment includes: a second uplink control information processing module 1101, configured to sort UCI of each downlink carrier in X downlink carrier(s) according to a preset sorting rule, where X is a positive integer, and the X downlink carrier(s) belong to a downlink activated carrier set of the user equipment; and a second coding and transmission module 1102, configured to: after the second uplink control information processing module sorts UCI of each downlink carrier in the X downlink carriers, perform channel coding for the sorted UCI of the X downlink carrier(s) according to the preset number of bits after channel coding of the of the user equipment, map the sorted UCI of the X downlink carrier(s) to a physical channel and transmit the sorted UCI of the X downlink carrier(s) to a base station.

Further, when UCI of the user equipment is hybrid automatic repeat request HARQ acknowledgment information, the X downlink carrier(s) are all downlink carriers in the downlink activated carrier set of the user equipment.

Further, the second uplink control information processing module 1101 includes: a fourth sorting unit, configured to sort UCI of each downlink carrier in the X downlink carrier(s) according to an activation sequence of the downlink carriers.

Further, the fourth sorting unit is specifically configured to: when UCI of the X downlink carrier(s) and a scheduling request SR are reported on the same subframe, first arrange the SR, and then arrange UCI of each downlink carrier in the X downlink carrier(s) after the SR according to an activation sequence of the downlink carriers.

Further, when UCI of each downlink carrier in the X downlink carrier(s) is sorted according to the activation sequence of the downlink carriers, if multiple downlink carriers are activated at the same time, UCI of the multiple downlink carriers activated at the same time is sorted according to attributes of the downlink carriers, where an attribute of a downlink carrier is a carrier index or a carrier frequency.

In the user equipment according to the embodiment of the present invention, the user equipment performs channel coding on original information of UCI of the X downlink carrier(s) according to the total original information of UCI of the X downlink carriers, determined based on the downlink activated carrier set, and the preset number of original information bits after channel coding of UCI of the X downlink carriers, and transmits the original information of UCI of the X downlink carrier(s) to the base station, thereby solving the problem that the base station decodes the jointly coded UCI incorrectly due to inconsistent understanding of the user equipment and base station on the total number of original information bits of UCI joint coding of multiple downlink carriers. Moreover, the user equipment sorts UCI of multiple downlink carriers according to the preset sorting rule, so that the base station may determine UCI corresponding to each downlink carrier.

Figure 12:
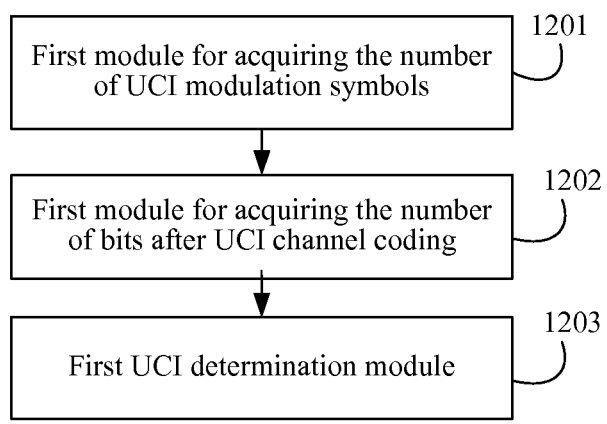
FIG. 12 is a schematic structural diagram of a base station according to an embodiment of the present invention.

Referring to FIG. 12, an embodiment of the present invention provides an base station, where the base station includes: a first module for acquiring the number of UCI modulation symbols 1201, configured to calculate, according to a first carrier set, the number of modulation symbols occupied by uplink control information UCI, where the first carrier set is one of the following sets: a downlink component carrier set of a user equipment, a maximum downlink carrier set supportable by the user equipment, and a smaller one of the downlink component carrier set of the user equipment and the maximum downlink carrier set supportable by the user equipment, and the downlink component carrier set of the user equipment at least includes two downlink component carriers; a first module for acquiring the number of bits after UCI channel coding 1202, configured to: after the first module for acquiring the number of UCI modulation symbols 1201 obtains the number of modulation symbols occupied by UCI, extract, according to the number of modulation symbols occupied by UCI, UCI transmitted by the UE, and calculate the number of bits after channel coding corresponding to the transmitted UCI; and a first UCI determination module 1203, configured to: after the first module for acquiring the number of bits after UCI channel coding 1202 obtains the number of bits after channel coding corresponding to the transmitted UCI, perform channel decoding on the transmitted UCI according to the number of bits after channel coding corresponding to the transmitted UCI, and determine UCI corresponding to each downlink carrier according to a preset sorting rule.

Further, the first module for acquiring the number of UCI modulation symbols 1201 includes: a first CSI modulation symbol number acquisition unit, configured to: when UCI is channel state information CSI, calculate the number of modulation symbols occupied by CSI, according to the first carrier set, CSI configuration configured by higher layers and whether aperiodic CSI is to be reported.

Further, the preset sorting rule includes one of the following rules: performing sorting according to an increasing order of attributes of downlink carriers corresponding to UCI of the downlink carriers, where an attribute of a downlink carrier is a carrier index or a carrier frequency; performing sorting according to a decreasing order of attributes of downlink carriers corresponding to UCI of the downlink carriers, where an attribute of a downlink carrier is a carrier index or a carrier frequency; performing sorting according to an activation sequence of the downlink carriers.

Further, when the preset sorting rule is performing sorting according to the activation sequence of the downlink carriers, if multiple downlink carriers are activated at the same time, UCI of the multiple downlink carriers activated at the same time is sorted according to the increasing or decreasing order of the attributes of the downlink carriers, where the attribute of the downlink carrier is a carrier index or a carrier frequency.

In the base station according to the embodiment of the present invention, the base station obtains, according to the first carrier set, the number of modulation symbols occupied by UCI, extracts, according to the number of modulation symbols occupied by UCI, UCI transmitted by the user equipment, and obtains the number of bits after channel coding corresponding to the transmitted UCI, thereby solving the problem that the base station decodes the jointly coded UCI incorrectly due to inconsistent understanding of the base station and the user equipment on the total number of original information bits of UCI joint coding of multiple downlink carriers. Moreover, the base station may determine UCI corresponding to each downlink carrier according to the preset sorting rule.

Figure 13:
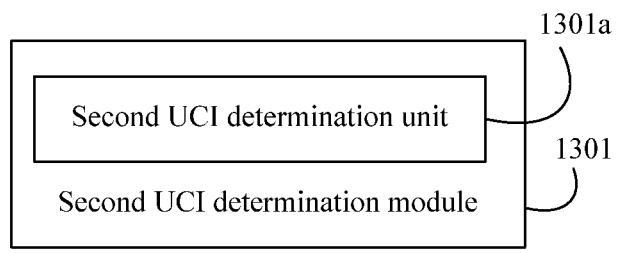
FIG. 13 is a schematic structural diagram of another base station according to an embodiment of the present invention.

Referring to FIG. 13, an embodiment of the present invention provides another base station, where the base station includes: a second UCI determination module 1301, configured to, according to the preset number of bits after channel coding corresponding to uplink control information UCI, perform detection on UCI transmitted by a UE, and determine UCI corresponding to each downlink carrier according to a preset sorting rule.

Further, when the preset sorting rule is performing sorting according to an activation sequence of the downlink carriers, if multiple downlink carriers are activated at the same time, UCI of the multiple downlink carriers activated at the same time is sorted according to an increasing or a decreasing order of attributes of the downlink carriers.

Further, the second UCI determination module 1301 includes: a second UCI determination module 1301a, configured to: when UCI and a scheduling request SR are reported on the same subframe, determine the SR and UCI corresponding to each downlink carrier according to a sequence of arranging the SR first, and then arranging UCI of X downlink carrier(s) after the SR based on an activation sequence of the downlink carriers.

In the base station according to the embodiment of the present invention, the base station performs detection on UCI transmitted by the user equipment, according to the preset number of bits after channel coding corresponding to the uplink control information UCI, thereby solving the problem that eNB decodes the jointly coded UCI incorrectly due to inconsistent understanding of the base station and the user equipment on the total number of original information bits of UCI joint coding of multiple downlink carriers. UCI corresponding to each downlink carrier may be determined according to the preset sorting rule.

Figure 14:
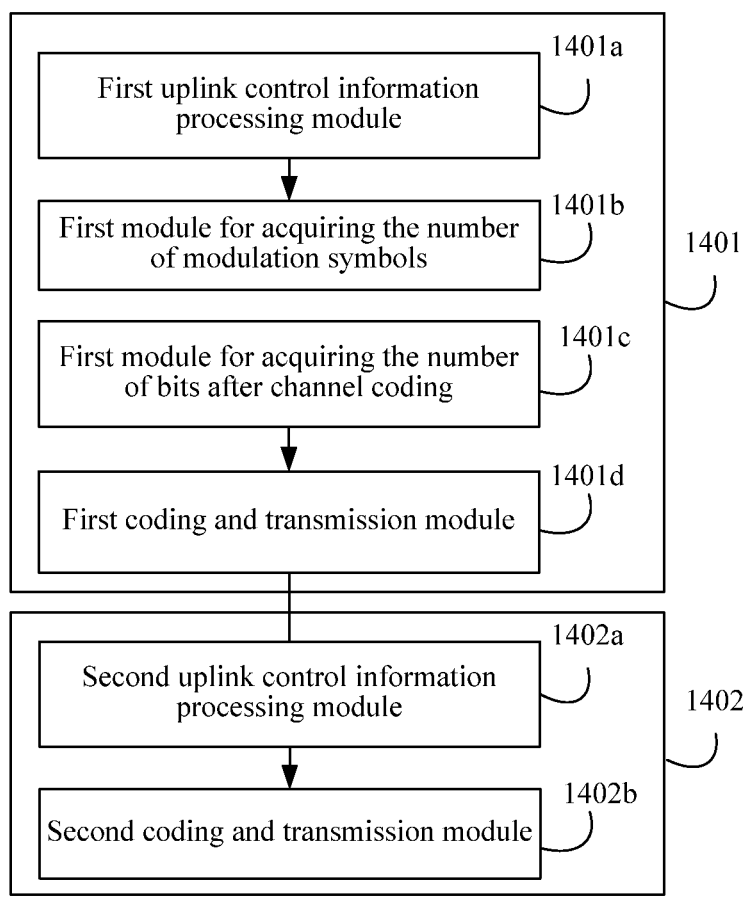
FIG. 14 is a schematic structural diagram of a system for transmitting uplink control information according to an embodiment of the present invention.

Referring to FIG. 14, an embodiment of the present invention provides a system for transmitting uplink control information, where the system includes a user equipment 1401 and a base station 1402.

The user equipment 1401 includes: a first uplink control information processing module 1401a, configured to sort UCI of each downlink carrier in X downlink carrier(s) according to a preset sorting rule, where X is a positive integer, the X downlink carrier(s) belong to a downlink component carrier set of the user equipment, the downlink component carrier set of the user equipment at least includes two downlink component carriers, and at least one downlink carrier in the X downlink carrier(s) belongs to a downlink activated carrier set of the user equipment; a first module for acquiring the number of modulation symbols 1401b, configured to, according to a first carrier set, calculate the number of modulation symbols occupied by UCI of the user equipment, where the first carrier set is one of the following sets: the downlink component carrier set of the user equipment, a maximum downlink carrier set supportable by the user equipment, and a smaller one of the downlink component carrier set of the user equipment and the maximum downlink carrier set supportable by the user equipment; a first module for acquiring the number of bits after channel coding 1401c, configured to: after the first module for acquiring the number of modulation symbols 1401b obtains the number of modulation symbols occupied by UCI of the user equipment, calculate the number of bits after channel coding of UCI of the user equipment according to the number of modulation symbols occupied by UCI of the user equipment; and a first coding and transmission module 1401d, configured to: after the first module for acquiring the number of bits after channel coding 1401c obtains the number of bits after channel coding of UCI of the user equipment, perform channel coding for the sorted UCI of the X downlink carrier(s) according to the number of bits after channel coding of UCI of the user equipment, map the sorted UCI of the X downlink carrier(s) to a physical channel and transmit the sorted UCI of the X downlink carrier(s) to the base station 1402.

The base station 1402 includes: a first module for acquiring the number of UCI modulation symbols 1402a, configured to, according to a first carrier set, calculate the number of modulation symbols occupied by uplink control information UCI, where the first carrier set is one of the following sets: the downlink component carrier set of the user equipment, the maximum downlink carrier set supportable by the user equipment, and a smaller one of the downlink component carrier set of the user equipment and the maximum downlink carrier set supportable by the user equipment, and the downlink component carrier set of the user equipment at least includes two downlink component carriers; a first module for acquiring the number of bits after UCI channel coding 1402b, configured to: after the first module for acquiring the number of UCI modulation symbols 1402a obtains the number of modulation symbols occupied by UCI, extract, according to the number of modulation symbols occupied by UCI, UCI transmitted by the UE, and calculate the number of bits after channel coding corresponding to the transmitted UCI; and a first UCI determination module 1402c, configured to: after the first module for acquiring the number of bits after UCI channel coding 1402b obtains the number of bits after channel coding corresponding to the transmitted UCI, perform channel decoding on the transmitted UCI according to the number of bits after channel coding corresponding to the transmitted UCI, and determine UCI corresponding to each downlink carrier according to a preset sorting rule.

Further, the first uplink control information processing module is specifically configured to: when UCI of the user equipment is hybrid automatic repeat request HARQ acknowledgment information, sort UCI of all downlink carriers in the downlink activated carrier set according to the preset sorting rule.

Further, the first uplink control information processing module is specifically configured to: when UCI of the user equipment is channel state information CSI, sort, according to the preset sorting rule, UCI of each downlink carrier in the X downlink carrier(s) that are determined based on CSI configuration configured by higher layers and whether aperiodic CSI is to be reported, where the X downlink carrier(s) belong to the downlink activated carrier set of the user equipment.

Further, the first uplink control information processing module 1401a includes one of the following units: a first sorting unit, configured to sort UCI of each downlink carrier in the X downlink carrier(s) according to an increasing order of attributes of downlink carriers corresponding to UCI of the downlink carriers, where an attribute of a downlink carrier is a carrier index or a carrier frequency; a second sorting unit, configured to sort UCI of each downlink carrier in the X downlink carrier(s) according to a decreasing order of attributes of downlink carriers corresponding to UCI of the downlink carriers, where an attribute of a downlink carrier is a carrier index or a carrier frequency; a third sorting unit, configured to sort UCI of each downlink carrier in the X downlink carrier(s) according to an activation sequence of the downlink carriers.

Further, the third sorting unit is specifically configured to: when UCI of each downlink carrier in the X downlink carrier(s) is sorted according to the activation sequence of the downlink carriers, if multiple downlink carriers are activated at the same time, sort UCI of the multiple downlink carriers activated at the same time, according to the increasing or decreasing order of the attributes of the downlink carriers, where the attribute of the downlink carrier is a carrier index or a carrier frequency.

Further, the first module for acquiring the number of modulation symbols 1401b includes: a unit for calculating the number of modulation symbols, configured to: when UCI is channel state information CSI, calculate the number of modulation symbols occupied by CSI of the user equipment, according to the first carrier set, CSI configuration configured by higher layers and whether aperiodic CSI is to be reported.

Further, the first carrier set may be the downlink component carrier set of the user equipment, the maximum downlink carrier set supportable by the user equipment, or a smaller one of the downlink component carrier set of the user equipment and the maximum downlink carrier set supportable by the user equipment.

Further, the first module for acquiring the number of UCI modulation symbols 1402a includes: a first CSI modulation symbol number acquisition unit, configured to: when UCI is channel state information CSI, calculate the number of modulation symbols occupied by CSI, according to the first carrier set, CSI configuration configured by higher layers and whether aperiodic CSI is to be reported.

In the system for transmitting uplink control information according to the embodiment of the present invention, the user equipment performs channel coding on UCI of the user equipment according to the acquired number of bits after channel coding of UCI of the user equipment, and transmits UCI to the base station, thereby solving the problem that the base station decodes the jointly coded UCI incorrectly due to inconsistent understanding of the user equipment and base station on the total number of original information bits of UCI joint coding of multiple downlink carriers. Moreover, the user equipment sorts UCI of multiple downlink carriers according to the preset sorting rule, so that the base station may determine UCI corresponding to each downlink carrier.

Figure 15:
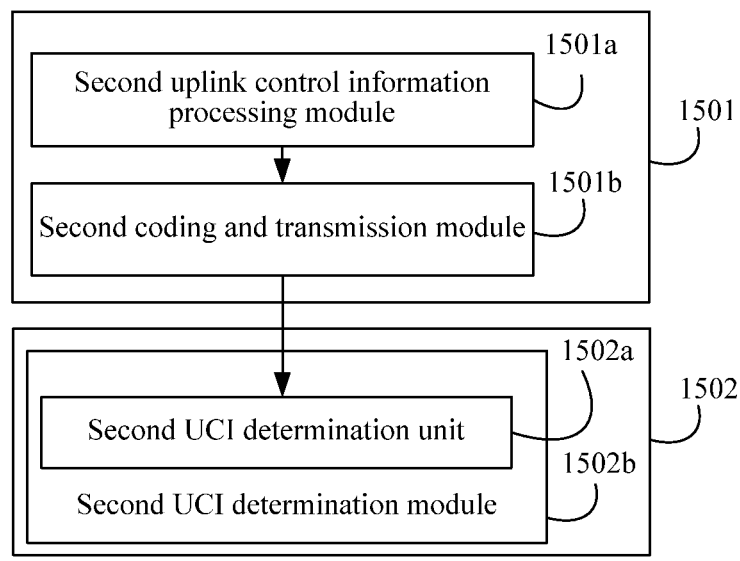
FIG. 15 is a schematic structural diagram of another system for transmitting uplink control information according to an embodiment of the present invention.

Referring to FIG. 15, an embodiment of the present invention provides another system for transmitting uplink control information, where the system includes a user equipment 1501 and a base station 1502.

The user equipment 1501 includes: a second uplink control information processing module 1501a, configured to sort UCI of each downlink carrier in X downlink carrier(s) according to a preset sorting rule, where X is a positive integer, and the X downlink carrier(s) belong to a downlink activated carrier set of the user equipment; and a second coding and transmission module 1501b, configured to: after the second uplink control information processing module 1501a sorts UCI of each downlink carrier in the X downlink carriers, perform channel coding for the sorted UCI of the X downlink carrier(s) according to the preset number of bits after channel coding of UCI of the user equipment, map the sorted UCI of the X downlink carrier(s) to a physical channel and transmit the sorted UCI of the X downlink carrier(s) to a base station 1502.

The base station 1502 includes: a second UCI determination module 1502a, configured to, according to the preset number of bits after channel coding corresponding to uplink control information UCI, perform detection on UCI transmitted by the user equipment 1501, and determine UCI corresponding to each downlink carrier according to a preset sorting rule.

Further, the second uplink control information processing module 1501a includes: a fourth sorting unit, configured to sort UCI of each downlink carrier in the X downlink carrier(s) according to an activation sequence of the downlink carriers.

Further, the second uplink control information processing module 1501a includes: a fifth sorting unit, configured to: when UCI of the X downlink carrier(s) and a scheduling request SR are reported on the same subframe, first arrange the SR, and then arrange UCI of each downlink carrier in the X downlink carrier(s) after the SR according to an activation sequence of the downlink carriers.

Further, when UCI of each downlink carrier in the X downlink carrier(s) is sorted according to the activation sequence of the downlink carriers, if multiple downlink carriers are activated at the same time, UCI of the multiple downlink carriers activated at the same time is sorted according to attributes of the downlink carriers, where an attribute of a downlink carrier is a carrier index or a carrier frequency.

Further, the second UCI determination module 1502a comprises: a second UCI determination unit, configured to: when UCI and a scheduling request SR are reported on the same subframe, determine the SR and UCI corresponding to each downlink carrier according to a sequence of arranging the SR first, and then arranging UCI of the X downlink carrier(s) after the SR based on an activation sequence of the downlink carriers.

In the system for transmitting uplink control information according to the embodiment of the present invention, the user equipment performs channel coding on original information of UCI of the X downlink carrier(s) through the total original information of UCI of the X downlink carrier(s) determined according to the downlink activated carrier set and through the preset number of bits after channel coding of UCI of the X downlink carriers, and transmits the original information of UCI of the X downlink carrier(s) to the base station, thereby solving the problem that the base station decodes the jointly coded UCI incorrectly due to inconsistent understanding of the user equipment and base station on the total number of original information bits of UCI joint coding of multiple downlink carriers. Moreover, the user equipment sorts UCI of multiple downlink carriers according to the preset sorting rule, so that the base station may determine UCI corresponding to each downlink carrier.

All or part of the content in the technical solutions provided in the foregoing embodiments may be implemented by software programs, and the software programs are stored in readable storage media, such as a computer hard disk, a CD-ROM, or a floppy disk.

The foregoing describes only exemplary embodiments of the present invention and is not intended to limit the present invention. Any modification, equivalent replacement, or improvement made within the idea and principle of the present invention shall fall within the protection scope of the present invention.

What is claimed is:

1. A non-transitory computer readable medium storing instructions codes for User Equipment (UE) transmitting uplink control information, which when executed by the UE performs the steps of:
    receiving a carrier activation command or a carrier deactivation command in a downlink subframe n;
    updating a first downlink activated carrier set according to the received carrier activation command or the carrier deactivation command into a second downlink activated carrier set;
    taking the second downlink activated carrier set as a current downlink activated carrier set corresponding to a first uplink subframe; wherein the first uplink subframe belongs to a subframe set of an uplink subframe n+k and at least one uplink subframe after the uplink subframe n+k; and wherein n or k is a positive integer, and k is greater than or equal to 5;
    sorting X pieces of Uplink Control Information (UCI) corresponding to X downlink carriers according to a sorting rule, wherein X is a positive integer, and the X downlink carriers belong to the current downlink activated carrier set; and
    transmitting the sorted X pieces of UCI to a base station in the first uplink subframe.

2. The non-transitory computer readable medium according to claim 1, wherein before the taking the second downlink activated carrier set as a current downlink activated carrier set, the instructions codes when executed by the UE further performs:
    taking the first downlink activated carrier set as the current downlink activated carrier set corresponding to a second uplink subframe of the at least one uplink subframe before the uplink subframe n+k;
    sorting Y pieces of UCI corresponding to Y downlink carriers according to the sorting rule, wherein Y is a positive integer, and the Y downlink carriers belong to the current downlink activated carrier set; and
    transmitting, the sorted Y pieces of UCI to the base station in the second uplink subframe.

3. The non-transitory computer readable medium according to claim 2, wherein the transmitting the sorted Y pieces of UCI to the base station comprises:
    calculating a number of modulation symbols occupied by the sorted Y pieces of UCI according to the first downlink activated carrier set;
    calculating a number of bits generated by channel coding of the sorted Y pieces of UCI according to the calculated number of modulation symbols;
    performing the channel coding for the sorted Y pieces of UCI according to the calculated number of bits generated by the channel coding;
    multiplexing the UCI, which has undergone the channel coding, on a Physical Uplink Share Channel (PUSCH) with data; and
    transmitting the multiplexed UCI to the base station.

4. The non-transitory computer readable medium according to claim 1, wherein the transmitting the sorted X pieces of UCI to the base station comprises:
    calculating a number of modulation symbols occupied by the sorted X pieces of UCI according to the second downlink activated carrier set;
    calculating a number of bits generated by channel coding of the sorted X pieces of UCI according to the calculated number of modulation symbols;
    performing the channel coding for the sorted X pieces of UCI according to the calculated number of bits generated by the channel coding;
    multiplexing the UCI, which has undergone the channel coding, on a Physical Uplink Share Channel (PUSCH) with data; and
    transmitting the multiplexed UCI to the base station.

5. The non-transitory computer readable medium according to claim 1, wherein the sorting rule comprises:
    sorting the X pieces of UCI corresponding to the X downlink carriers according to an increasing order of attributes of the X downlink carriers, wherein an attribute is a carrier index or a carrier frequency.

6. The non-transitory computer readable medium according to claim 1, wherein when the UCI of the UE is channel state information (CSI), the X downlink carriers are determined according to CSI configuration configured by higher layers and whether aperiodic CSI is to be reported.

7. A non-transitory computer readable medium storing instructions codes for base station transmitting uplink control information, which when executed by the base station performs the steps of:
    sending a carrier activation command or a carrier deactivation command in a downlink subframe n;
    receiving sorted X pieces of Uplink Control Information (UCI) corresponding to X downlink carriers in a first uplink subframe from a user equipment (UE); and
    determining a piece of UCI corresponding to a downlink carrier of the X downlink carriers from sorted X pieces of UCI;
    wherein the sorted X pieces of UCI are sorted by the UE according to a sorting rule;
    wherein X is a positive integer, and the X downlink carriers belong to a current downlink activated carrier set;
    wherein a first downlink activated carrier set is updated by the UE into a second downlink activated carrier set according to the carrier activation command or the carrier deactivation command and the second downlink activated carrier is taken as the current downlink activation carrier set corresponding to the first uplink subframe; and
    wherein the first uplink subframe belongs to a subframe set of an uplink subframe n+k and at least one uplink subframe after the uplink subframe n+k, and n or k is a positive integer, and k is greater than or equal to 5.

8. The non-transitory computer readable medium according to claim 7, wherein the determining the piece of UCI corresponding to the downlink carrier of the X downlink carriers from the sorted X pieces of UCI, comprises:

calculating a number of modulation symbols occupied by the sorted X pieces of the UCI according to the second downlink activated carrier set;

calculating a number of bits generated by channel coding of the sorted X pieces of UCI according to the calculated number of modulation symbols;

performing channel decoding on the received sorted X pieces of the UCI according to the calculated number of bits generated by the channel coding; and determining the piece of UCI corresponding to the downlink carrier of the X downlink carriers from the channel decoded UCI according to the sorting rule.

9. The non-transitory computer readable medium according to claim 7, wherein the preset sorting rule comprises:

sorting the X pieces of UCI corresponding to the X downlink carriers according to an increasing order of attributes of the X downlink carriers, wherein an attribute is a carrier index or a carrier frequency.

10. The non-transitory computer readable medium according to claim 7, wherein when the UCI of the UE is channel state information (CSI), the X downlink carriers are determined according to CSI configuration configured by higher layers and whether aperiodic CSI is to be reported.

* * * * *